(12) United States Patent
Tonari et al.

(10) Patent No.: US 9,444,319 B2
(45) Date of Patent: Sep. 13, 2016

(54) POWER TRANSMISSION APPARATUS

(71) Applicant: DENSO CORPORATION, Kariya, Aichi-pref. (JP)

(72) Inventors: Tatsuya Tonari, Chiryu (JP); Shin Kusase, Obu (JP); Hidenori Katou, Nagoya (JP); Yousuke Kaname, Kariya (JP); Naoto Sakurai, Kasugai (JP)

(73) Assignee: DENSO CORPORATION, Kariya (JP)

( * ) Notice: Subject to any disclaimer, the term of this patent is extended or adjusted under 35 U.S.C. 154(b) by 187 days.

(21) Appl. No.: 14/491,739

(22) Filed: Sep. 19, 2014

(65) Prior Publication Data
US 2015/0075886 A1  Mar. 19, 2015

(30) Foreign Application Priority Data
Sep. 19, 2013  (JP) .................................. 2013-194172

(51) Int. Cl.
| H02K 16/02 | (2006.01) |
| H02K 49/10 | (2006.01) |
| B60K 6/26 | (2007.10) |
| B60K 6/36 | (2007.10) |
| B60K 6/46 | (2007.10) |
| H02K 51/00 | (2006.01) |

(52) U.S. Cl.
CPC .............. *H02K 49/102* (2013.01); *B60K 6/26* (2013.01); *B60K 6/36* (2013.01); *B60K 6/46* (2013.01); *H02K 16/02* (2013.01); *H02K 51/00* (2013.01); *Y10S 903/906* (2013.01); *Y10S 903/909* (2013.01)

(58) Field of Classification Search
CPC ........................... H02K 49/102; H02K 16/02
See application file for complete search history.

(56) References Cited

U.S. PATENT DOCUMENTS

| 5,633,555 A * | 5/1997 | Ackermann ......... H02K 49/102 310/103 |
| 8,653,677 B2 * | 2/2014 | West ....................... F02B 37/00 290/1 C |
| 9,013,081 B2 * | 4/2015 | Atallah ................ H02K 49/102 310/103 |

(Continued)

FOREIGN PATENT DOCUMENTS

| CN | 103001454 | 3/2013 |
| GB | 2 457 682 | 8/2009 |

(Continued)

OTHER PUBLICATIONS

Office Action (3 pages) dated Jul. 28, 2015, issued in corresponding Japanese Application No. 2013-194172 and English translation (4 pages).

*Primary Examiner* — Dang Le
(74) *Attorney, Agent, or Firm* — Nixon & Vanderhye P.C.

(57) ABSTRACT

An electric rotating machine includes a power transmission mechanism and an armature. The power transmission mechanism is equipped with a first, a second, and a third rotor. The first rotor includes n soft-magnetic members. The second rotor includes k soft-magnetic members. Note that n and k are an integer more than one. The third rotor is made up of magnets whose number of pole pairs is m where m is an integer more than or equal to one. The armature faces the third rotor. The first, second, and third rotors are arranged so as to establish a magnetic coupling among them. The soft-magnetic members of the first and second rotors and the magnets of the third rotor meet a relation of $2m=|k \pm n|$. This arrangement is capable of achieving the transmission of power regardless of electric energization of the armature.

10 Claims, 20 Drawing Sheets

(56) References Cited

U.S. PATENT DOCUMENTS

| | | |
|---|---|---|
| 9,337,708 B2 * | 5/2016 | Nakatsugawa ........ H02K 16/02 |
| 2011/0037333 A1 | 2/2011 | Atallah et al. |
| 2011/0042965 A1 | 2/2011 | Atallah et al. |
| 2011/0115326 A1 | 5/2011 | Clark et al. |
| 2011/0127869 A1 | 6/2011 | Atallah et al. |
| 2011/0163623 A1 | 7/2011 | Rens et al. |
| 2013/0057100 A1 * | 3/2013 | Fukushima ............ H02K 51/00 310/114 |
| 2015/0076948 A1 | 3/2015 | Katou et al. |

FOREIGN PATENT DOCUMENTS

| | | |
|---|---|---|
| JP | 7-264838 | 10/1995 |
| JP | 2013-055809 | 3/2013 |
| JP | 2015-061422 | 3/2015 |
| WO | WO 96/22630 | 7/1996 |

* cited by examiner

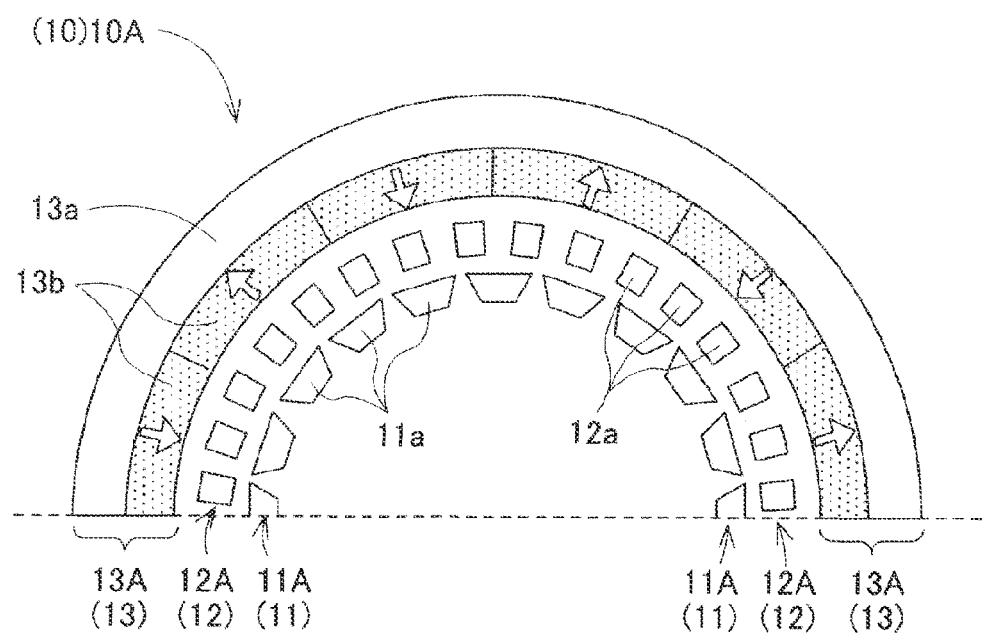
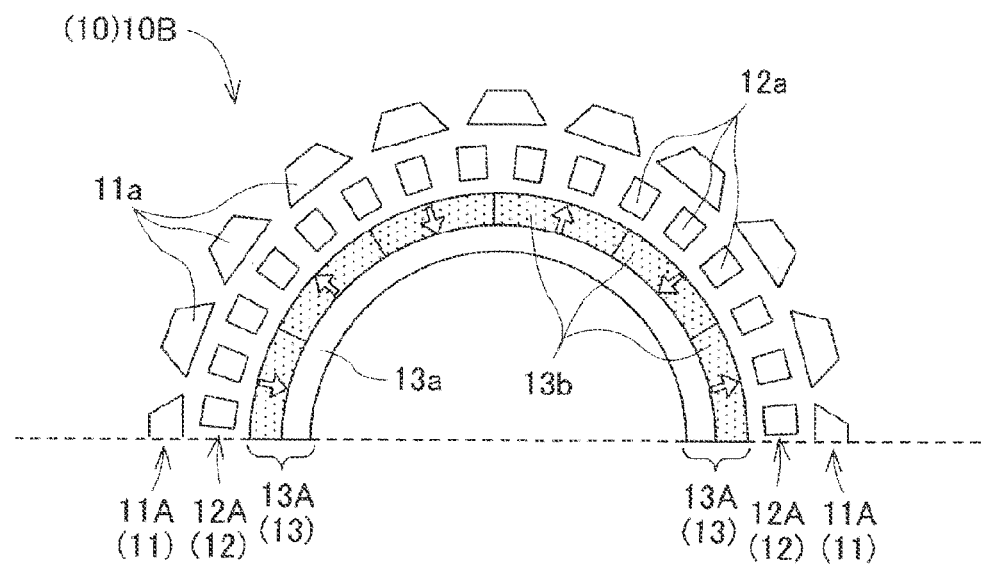

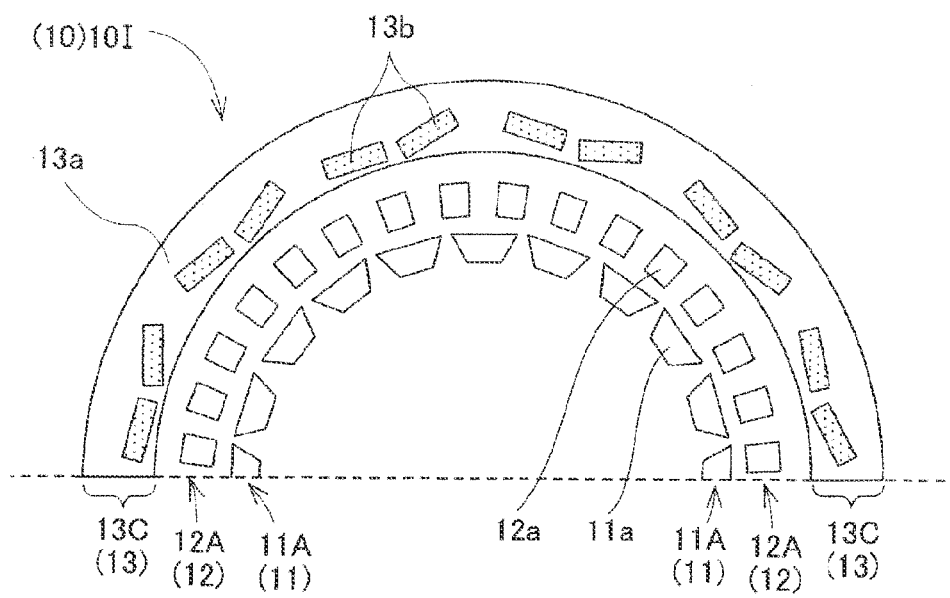
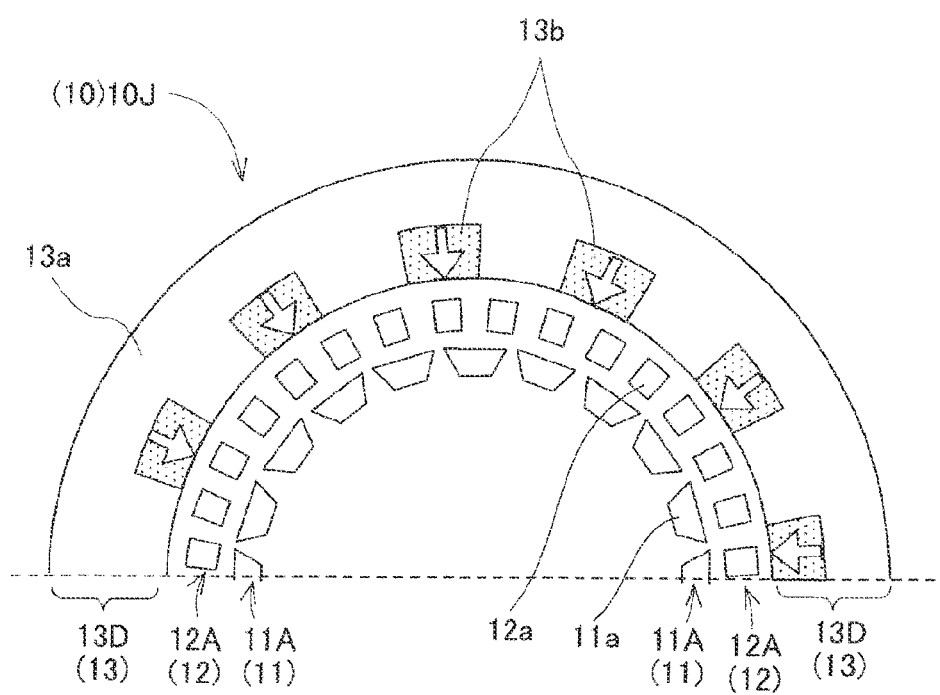

POWER TRANSMISSION APPARATUS

CROSS REFERENCE TO RELATED DOCUMENT

The present application claims the benefit of priority of Japanese Patent Application No. 2013-194172 filed on Sep. 19, 2013, the disclosure of which is incorporated herein by reference.

BACKGROUND OF THE INVENTION

1. Technical Field

This disclosure relates generally to an electric rotating machine equipped with a first rotor, a second rotor, and a third rotor, and also to a power generator equipped with such an electric rotating machine for use in vehicles.

2. Background Art

International Publication No. WO 96/22630 teaches an example of a magnetic coupling device engineered to mechanically align rotors with accuracy. The magnetic coupling device is equipped with at least one current-energized means which is responsive to application of electric current to create magnetic force which magnetically couples components, such as rotors, together to establish transmission of power therethrough. Specifically the magnetic coupling device is always required to foe electrically energized to function as a magnetic gear.

SUMMARY

It is therefore an object to provide an improved structure of an electric rotating machine and a power generator using an electric rotating machine for use in vehicles which is capable of functioning as a magnetic gear without the need to be electrically energized.

According to one aspect of this disclosure, there is provided an electric rotating machine which may be used in vehicles. The electric rotating machine comprises a power transmission mechanism and an armature. The power transmission mechanism is equipped with a first rotor, a second rotor, and a third rotor and works to transmit power using magnetic force. The first rotor includes n soft-magnetic members where n is an integer more than one. The second rotor includes k soft-magnetic members where k is an integer more than one. The third rotor includes magnets whose number of pole pairs is m where m is an integer more than or equal to one. The armature is disposed so as to face the third rotor. The first rotor, the second rotor, and the third rotor are arranged so as to establish a magnetic coupling among them. The soft-magnetic members of the first and second rotors and the magnets of the third rotor meet a relation a relation of $2m=|k\pm n|$.

The above arrangement functions as a magnetic gear to achieve the transmission of power or torque through the first rotor, the second rotor, and/or the third rotor without need for electric energization of the armature.

According to another aspect of the disclosure, there is provided a power generator for a vehicle. The power generator comprises: (a) an electric rotating machine; (b) a first power transmitting member, (c) a second power transmitting member, and (d) a rotation controller. The electric rotating machine includes a power transmission mechanism and an armature. The power transmission mechanism is equipped with a first rotor, a second rotor, and a third rotor and works to transmit power using magnetic force. The first rotor includes n soft-magnetic members where n is an integer more than one. The second rotor includes k soft-magnetic members where k is an integer more than one. The third rotor includes magnets whose number of pole pairs is m where m is an integer more than or equal to one. The first rotor, the second rotor, and the third rotor are arranged so as to establish a magnetic coupling among them. The soft-magnetic members of the first and second rotors and the magnets of the third rotor meet a relation a relation of $2m=|k\pm n|$. The first power transmitting member establishes a mechanical connection between a first selected one of the first rotor, the second rotor, and the third rotor and an engine to achieve transmission of power only in one direction or in both directions therebetween. The second power transmitting mechanism connects with a second selected one of the first rotor, the second rotor, and the third rotor to achieve transmission of power only in one direction or in both directions therebetween. The second selected, one is different from the first selected one. The rotation controller connects with the armature and works to control rotation of at least one of the first rotor, the second rotor, and the third rotor.

The above arrangement functions as a magnetic gear to achieve the transmission of power or torque through the first rotor, the second rotor, and/or the third rotor without need for electric energization of the armature.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1 is a partial transverse sectional view which illustrates a power transmission mechanism of the first example according to the first embodiment;

FIG. 2 is a partial transverse sectional view which illustrates a power transmission mechanism of the second example according to the first embodiment;

FIG. 9(*b*) is a partially exploded view which illustrates a structure of a second rotor of the power transmission mechanism of the sixth example of FIG. 8;

FIG. 14 is a partial transverse sectional view which illustrates a power transmission mechanism of the ninth example according to the first embodiment;

FIG. 15 is a partial transverse sectional view which illustrates a power transmission mechanism of the tenth example according to the first embodiment;

DESCRIPTION OF THE PREFERRED EMBODIMENTS

Figure 3:
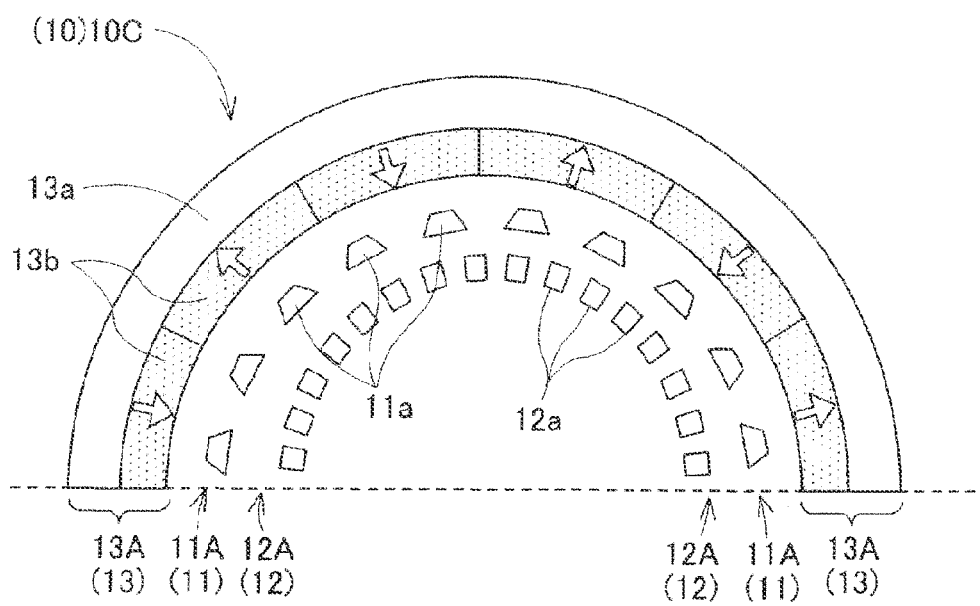
FIG. 3 is a partial transverse sectional view which illustrates a power transmission mechanism of the third example according to the first embodiment.

Embodiments of the invention will be described below with reference to the drawings. The following disclosure will refer to a plurality of types of power transmission mechanisms. Each view illustrates only essential parts required for better understanding the embodiments of the invention, not all parts of the power transmission mechanisms. Terms of orientation, such as upper, lower, right, and left, as referred to in the following discussion, are just defined based on the drawings. The power transmission mechanisms each have a plurality of rotors arranged in non-contact with each other through an air gap so that they are rotatable.

First Embodiment

FIGS. 1 to 20 illustrate a plurality of examples of the power transmission mechanism 10 or 20 according to the first embodiment. Each of the power transmission mechanisms 10 and 20 works to transmit or output the power or torque, as inputted from an external power source, to the outside using magnetic force. The power transmission mechanisms 10A to 10M, as referred to below, are examples of the power transmission mechanism 10 which is of a radial type. The power transmission mechanisms 20A and 20B, as referred to below, are examples of the power transmission mechanism 20 which is of an axial type. Each of FIGS. 1 to 20 is a schematic view which omits hatching except for shaded magnets for better visibility thereof and illustrates only a half of a traverse section of the power transmission mechanism 10 or 20. Throughout the drawings, like reference numbers refer to like parts. The explanation of the second and following examples will omit the same parts as those in the first example for the brevity of disclosure.

First Example

The power transmission mechanism 10A is, as shown in FIG. 1, equipped with a first rotor 11A, a second rotor 12A, and a third rotor 13A. The first rotor 11A, the second rotor 12A, and the third rotor 13A are arranged in this order radially from the inside to the outside of the power transmission mechanism 10A. The first rotor 11A is an example of a first rotor 11 of the power transmission mechanism 10. The second rotor 12A is an example of a second rotor 12 of the power transmission mechanism 10. Similarly, the third rotor 13A is an example of a third rotor 13 of the power transmission mechanism 10.

The first rotor 11A includes n (=integer more than one, in other words, more than or equal to two) soft-magnetic blocks 11a which are arrayed at regular intervals away from each other in a circumferential direction thereof. Each of the soft-magnetic blocks 11a is of a trapezoidal shape and oriented with the long side thereof facing the second rotor 12A in a radially outward direction. The second rotor 12A includes k (=integer more than one) soft-magnetic blocks 12a which are arrayed at regular intervals away from each other in a circumferential direction thereof. Each of the soft-magnetic blocks 12a is of a rectangular or square shape, but may alternatively be formed to have another shape.

The third rotor 13A includes a soft-magnetic cylinder 13a and magnets 13b whose number of pole pairs is m (=integer more than or equal to one). Each of the magnets 13b is implemented by a permanent magnet made of material showing an electrical resistivity of 3 $\mu\Omega$m or more. The magnetization direction that is a direction in which each of the magneto 13b is magnetized is expressed by an arrow in the drawing. The magnets 13b are located inside the soft-magnetic cylinder 13a, in other words, arranged to face the second rotor 12A in order to facilitate the ease of flow of magnetic flux, as produced thereby, to the second rotor 12A. The soft-magnetic cylinder 13a is disposed outside the magnets 13b in order to make the magnetic flux, as produced by the magnets 13b, flow through the solo-magnetic cylinder 13a. The soft-magnetic cylinder 13a of this embodiment in FIG. 1 is not needed in a structure where an armature is disposed to lace the third rotor 13A (see the second embodiment).

The n soft-magnetic blocks 11a of the first rotor 11A may be made up of at least two discrete soft-magnetic segments each of which serves as a pole segment. Similarly, the k soft-magnetic blocks 12a of the second rotor 12A may be made up of at least two discrete soft-magnetic segments each of which serves as a pole segment. Each of the pole segments is made of, for example, a stack of thin magnetic steel plates. The soft-magnetic blocks 12a of the second rotor 12A interposed between the first rotor 11A and the third rotor 13 A work as magnetic inductors. Each of the soft-magnetic blocks 11a of the first rotor 11A is, as can be seen, in FIG. 1, disposed to face at least one of the soft-magnetic blocks 12a of the second rotor 12A in the radial direction of the first and second rotors 11A and 12A in order to establish magnetic coupling therebetween. In other words, each of the soft-magnetic blocks 11a of the first rotor 11A functions as one of discrete gear teeth of a typical magnetic gear which is magnetically coupled with one of the soft-magnetic blocks 12a of the second rotor 12A. Similarly, each of the soft-magnetic blocks 12a of the second rotor 12A functions as one of discrete gear teeth of a typical magnetic gear which is magnetically coupled with one of the soft-magnetic blocks 11a of the first rotor 11A. This layout minimizes the leakage of magnetic flux from one of the soft-magnetic blocks 11a to another without allowing it to flow to the second rotor 12A and also minimizes the leakage of magnetic flux from one of the soft-magnetic blocks 12a to another without it flowing to the first rotor 11A.

The n soft-magnetic blocks 11a, the k soft-magnetic blocks 12a, and the magnets 13b whose number of pole pairs is m are selected to meet a relation of $2m=|k\pm n|$. In the structure of FIG. 1, n=20, k=32, and m=6 (i.e., $2m=|k\pm n|$). These numbers may be determined depending upon the type or rating of the power transmission mechanism 10A. It is advisable that the number of pole pairs of the soft-magnetic blocks 12a of the second rotor 12A be greater than that of the soft-magnetic blocks 11a of the first rotor 11A.

Second Example

FIG. 2 illustrates the power transmission mechanism 10B which is, like the power transmission mechanism 10A, equipped with the first rotor 11A, the second rotor 12A, and the third rotor 13A. The power transmission mechanism 10B is different from the power transmission mechanism 10A in layout of the first rotor 11A, the second rotor 12A, and the third rotor 13A. Specifically, the power transmission mechanism 10B has the first rotor 11A, the second rotor 12A, and the third rotor 13A arranged radially from the outside to the inside thereof. Other arrangements are identical with those in the first example. The structure of the second example is also substantially identical in operation and beneficial effects with the first example.

Third Example

FIG. 3 illustrates the power transmission mechanism 10C which is, like the power transmission mechanism 10A, equipped with the first rotor 11A, the second rotor 12A, and the third rotor 13A. The power transmission mechanism 10C is different from the power transmission mechanism 10A at layout of the first rotor 11A and the second rotor 12A. Specifically, the power transmission mechanism 10C has the second rotor 12A disposed inside the first rotor 11A in the radial direction thereof.

The power transmission mechanism 10C, although not illustrated, may be designed to have the second rotor 12A, the first rotor 11A, and the third rotor 13A arranged in this order in the radial direction from outside to inside thereof. Other arrangements are identical with those in the first example. The structure of the third example is also substantially identical in operation and beneficial effects with the first example.

Fourth Example

Figure 4:
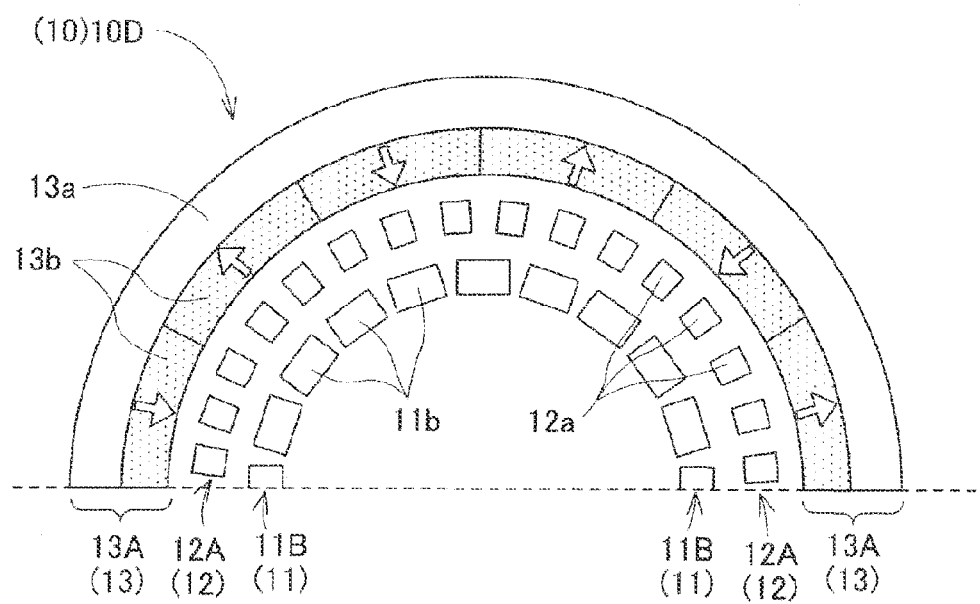
FIG. 4 is a partial transverse sectional view which illustrates a power transmission mechanism of the fourth example according to the first embodiment.

FIG. 4 illustrates the power transmission mechanism 10D which is equipped with the first rotor 11B, the second rotor 12A, and the third rotor 13A. The first rotor 11B, the second rotor 12A, and the third rotor 13A are arranged in this order radially from the inside to the outside of the power transmisssion mechanism 10D. The first rotor 11B is an example of the first rotor 11 and includes n soft-magnetic blocks 11b which are arrayed at regular intervals away from each other in the circumferential direction of the power transmission mechanism 10D. Each of the soft-magnetic blocks 11b is of a square or rectangular shape. Other arrangements are identical with those in the first example. The structure of the fourth example is also substantially identical in operation and beneficial effects with the first example.

The power transmission mechanism 10D, although not illustrated, may be designed to have the first rotor 11B, second rotor 12A, and the third rotor 13A arranged in this order in the radial direction from the outside to the inside thereof. The power transmission mechanism 10D may also be engineered to have the second rotor 12A, the first rotor 11B, and the third rotor 13A in this order radially from the inside to the outside or the outside to the inside thereof.

Other arrangements are identical with those in the first example. The structure of the fourth example is also substantially identical in operation and beneficial effects with the first example.

Fifth Example

Figure 5:
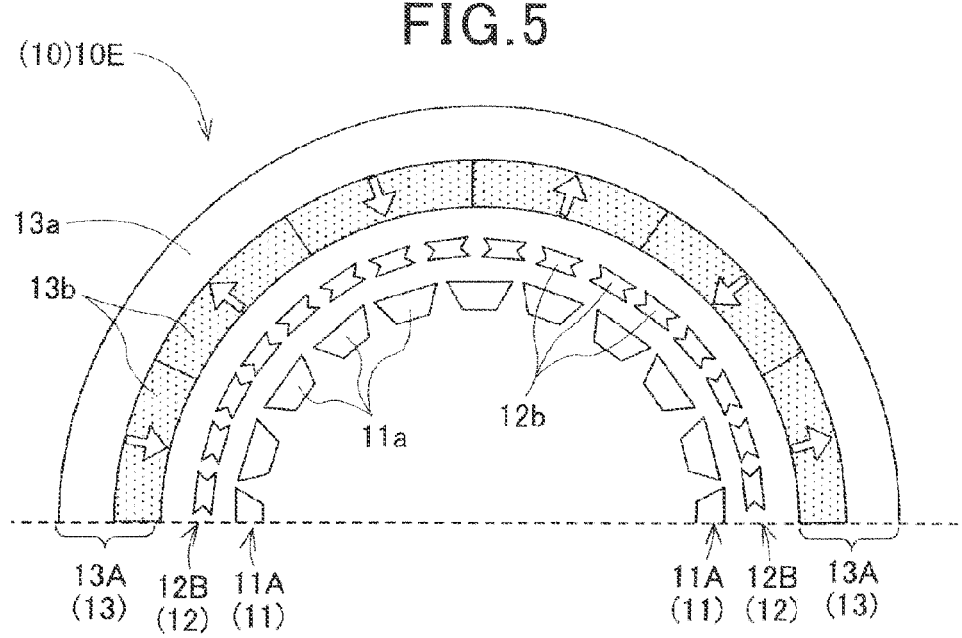
FIG. 5 is a partial transverse sectional view which illustrates a power transmission mechanism of the fifth example according to the first embodiment.

FIG. 5 illustrates the power transmission mechanism 10E which is equipped with the first rotor 11A, the second rotor 12B, and the third rotor 13A. The first rotor 11A, the second rotor 12B, and the third rotor 13A are arranged in this order radially from the inside to the outside of the power transmission mechanism 10E. The second rotor 12B is an example of the second rotor 12 and includes k soft-magnetic blocks 12B which are arrayed at regular intervals away from each other in the circumferential direction of the power transmission mechanism 10E. Each of the soft-magnetic blocks 12a in FIG. 1 is, as described above, rectangular or square with all flat surfaces, while each of the soft-magnetic blocks 12b in FIG. 5 is shaped to have non-planar side surfaces. The side surfaces of the soft-magnetic blocks 12b, as referred to herein, are surfaces thereof facing each other. In the illustrated case where the soft-magnetic blocks 12b are arrayed in the circumferential direction of the second rotor 12B, the side surfaces of the soft-magnetic blocks 12b are the surfaces thereof facing each other in the circumferential direction. Other arrangements are identical with those in the first example. The structure of the filth example is also substantially identical in operation and beneficial effects with the first example.

Figure 6:
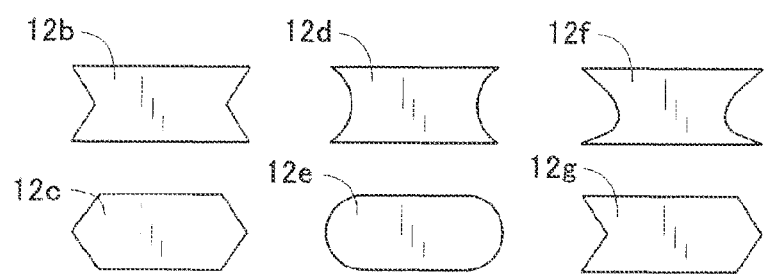
FIG. 6 is a plane view which illustrates modifications of soft-magnetic blocks of a second rotor of a power transmission mechanism.

It is advisable that a radially intermediate one of the three rotors 11, 12, and 13 (e.g., the second rotor 12B in the fifth example of FIG. 5) be engineered to have soft-magnetic blocks with non-planar side surfaces. The non-planar side surfaces are shaped to have irregularities, one or more concavities, one or more convex portions, and/or curved surfaces. The non-planar side surfaces of each of the soft-magnetic blocks 12b in FIG. 5 are V-shaped in cross section, but may be formed in another shape. For instance, the second rotor 12B may be shaped, as illustrated in FIG. 6, to have any of types of soft-magnetic blocks 12c, 12d, 12e, 12f, and 12g. For facilitating comparison of the shape among them, FIG. 6 shows the soft-magnetic blocks 12b at the upper left, hand corner thereof. The soft-magnetic block 12c has side surfaces with a chevron protrusion. The soft-magnetic block 12d has side surfaces with a U-shaped or are-shaped recess. The soft-magnetic block 12e has side surfaces with an arc-shaped or domed protrusion. The soft-magnetic block 12f has side surfaces with a combination of flat and curved areas. The soft-magnetic block 12g has side surfaces; one having a V-shaped, concave portion and the other having a V-shaped concave portion. Of course, the second rotor 12B may have soft-magnetic blocks with non-planar side surfaces of another shape. The non-planar side surfaces of the soft-magnetic blocks 12b work to minimize a leakage of magnetic flux from one of them to another, which facilitates bow of the magnetic flux from the surfaces facing the first and third rotors 11A and 13A. The first to fifteenth examples may have any of the soft-magnetic blocks 12b to 12g.

Figure 7:
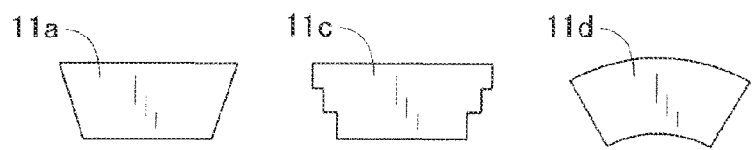
FIG. 7 is a plane view which illustrates modifications of soft-magnetic blocks of a second rotor of a power transmission mechanism.

An outermost or innermost one of the first to third rotors 11 to 13 (e.g., the first rotor 11A in FIG. 5) is preferably shaped to have soft-magnetic blocks with long and short sides. Each of the soft-magnetic blocks 11a of the first rotor 11A is, as described above, of a trapezoidal shape, but may be made to have another shape. FIG. 7 illustrates examples of the shape of each of the soft-magnetic blocks 11a. For facilitating comparison of the shape among them, FIG. 7 shows the soft-magnetic blocks 11a on the left hand side thereof. The soft-magnetic block 11c is substantially of a trapezoidal shape with stepwise side surfaces. The soft-magnetic block 11d is of a fan or sectorial shape with arc-shaped concave surfaces facing the adjacent first and thud rotors 11A and 13A. The soft-magnetic blocks 12a to 12g in FIGS. 1 and 6 may be designed to have the fan-shape, like the soft-magnetic block 11d. Each of the soft-magnetic blocks 11a may alternatively be made to be rectangular or non-rectangular. The soft-magnetic blocks 11c or 11d may be employed in any of the first to fourth or sixth to fifteenth examples. Although not illustrated, the power transmission mechanism 10E of the fifth example may be modified in the same way as described in the second to fourth examples to achieve the same effects.

Sixth Example

Figure 8:
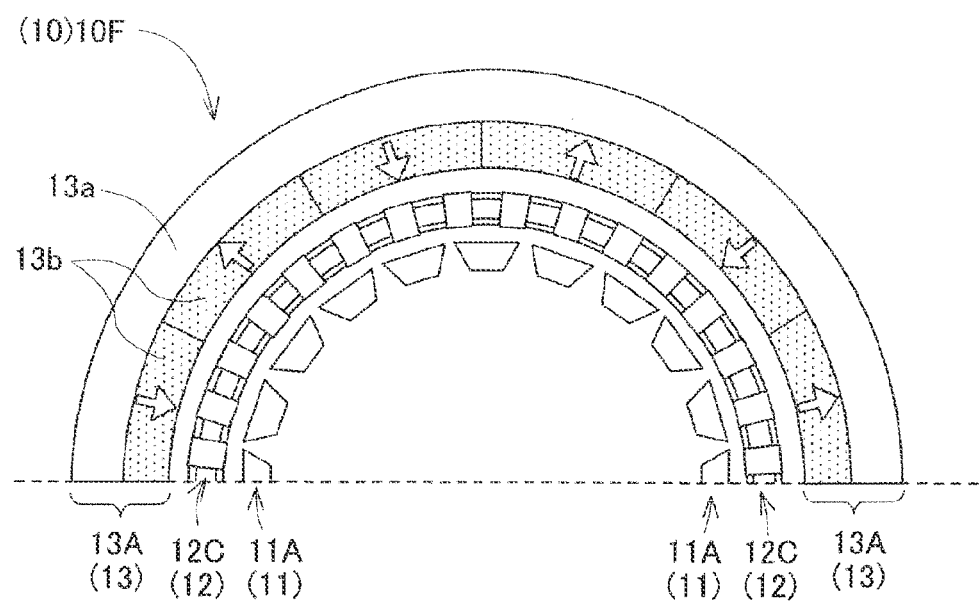
FIG. 8 is a partial transverse sectional view which illustrates a power transmission mechanism of the sixth example according to the first embodiment.
Figure 9A:
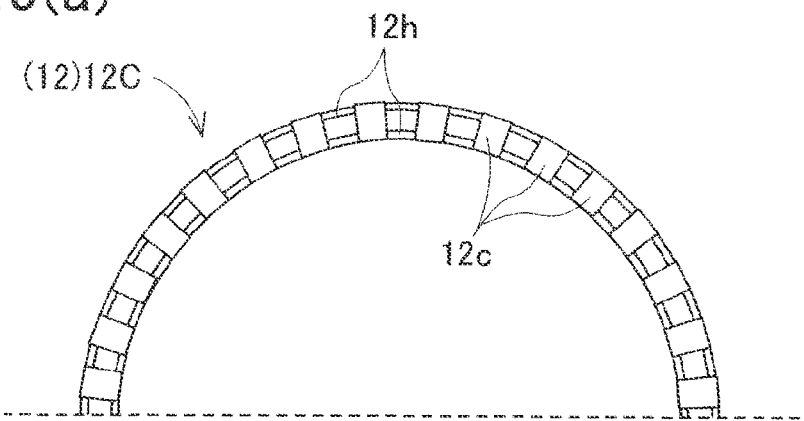
FIG. 9(*a*) is a partial plane view which illustrates a structure of a second rotor of the power transmission mechanism of the sixth example of FIG. 8.
FIG. 9(c) is a partially exploded view which illustrates a structure of a second, rotor of the power transmission mechanism of the sixth example of FIG. 8.
Figure 9B:
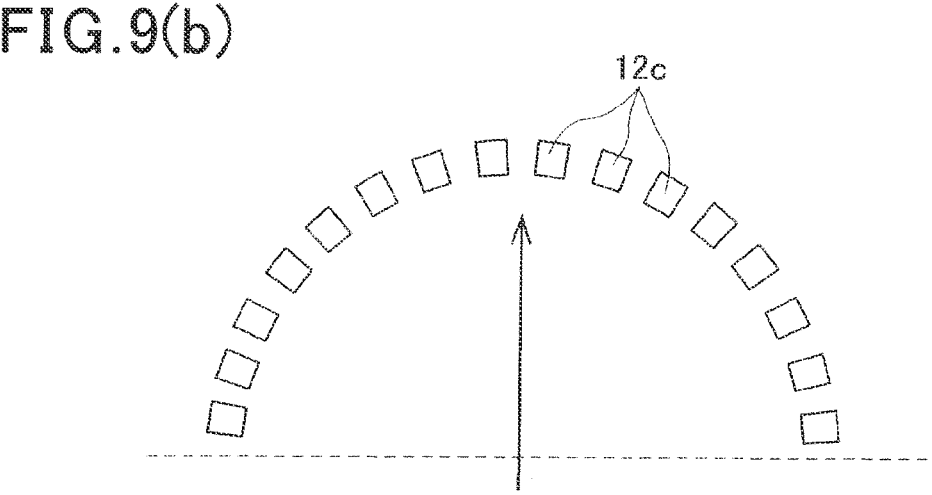
Figure 9C:
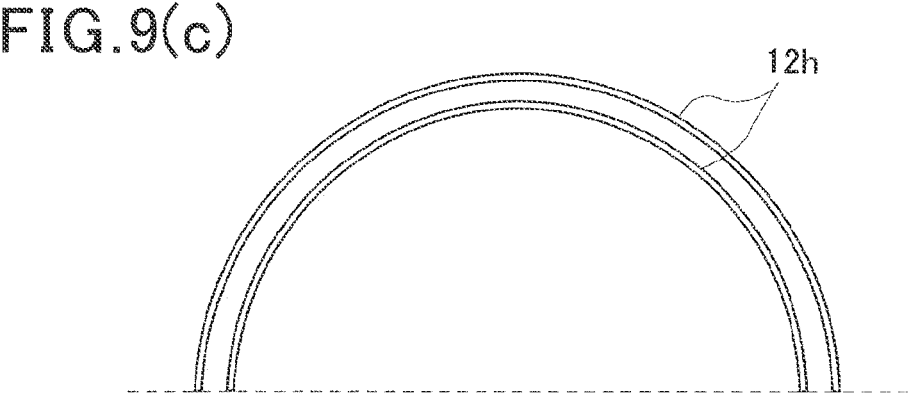

FIG. 8 illustrates the power transmission mechanism 10F which is equipped with the first rotor 11A, the second rotor 12C, and the third rotor 13A. The first rotor 11A, the second rotor 12C, and the third rotor 13A are arranged in this order radially from the inside to the outside of the power transmission mechanism 10F. The second rotor 12C is an example of the second rotor 12 and, as illustrated in FIGS. 9(a) to 9(c), includes k soft-magnetic blocks 12c and bridges 12h. The k soft-magnetic blocks 12c are arrayed at regular intervals away from each other in the circumferential direction of the power transmission mechanism 10F. The bridges 12h work as fasteners to retain some or all of the soft-magnetic blocks 12c. Specifically, the, k soft-magnetic blocks 12c are, as illustrated in FIG. 9(b), arrayed at regular intervals away from each other. The bridges 12h are, as illustrated in FIG. 9(c), arranged at a given interval away from each other in the radial direction of the power transmission mechanism 10F to hold some or ail of the k soft-magnetic blocks 12c firmly in a given manner. The holding of some or all of the k soft-magnetic blocks 12c through the bridges 12h may be achieved by bolts, screws, soldering, arc-welding, or glueing (or bonding). The bridges 12h may be made of soft-magnetic material. In this case, some or all of the k soft-magnetic blocks 12c and the bridges 12h may be formed integrally with each other.

Figure 10A:
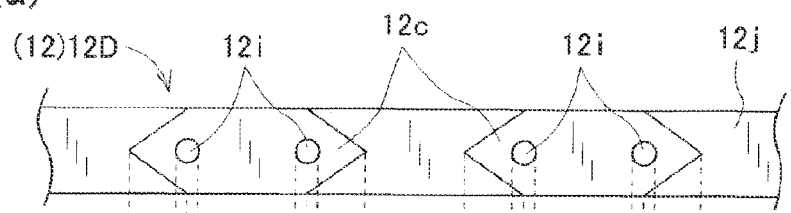
FIG. 10(a) is a plane view which illustrates a modification of a second rotor of the power transmission mechanism of the sixth example of FIG. 8.
Figure 10B:
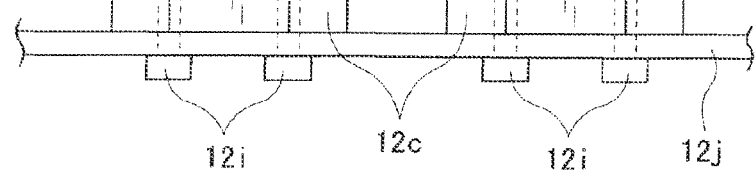
FIG. 10(b) is a side view of FIG. 10(a)

The some or all of the k soft-magnetic blocks 12c may be retained or joined together in another way without use of the bridges 12h. FIGS. 10(a), 10(b), 11(a), 11(b), and 11(c) illustrate second rotors 12D and 12E that are modifications of the second rotor 12C. The second rotor 12D of FIG. 10 includes the soft-magnetic blocks 12c, fasteners 12i, and a plate 12j. FIG. 10(a) is a plane view of the second rotor 12D. FIG. 10(b) is a side view of the second rotor 12D. The plate 12j is used as a bridge and has an annular or hollow cylindrical shape. The soft-magnetic blocks 12c are secured to the plate 12j through the fasteners 12i. The fasteners 12i are implemented by, for example, screws or bolts. The plate 12j may be made of material other than non-magnetic material, but preferably made of it.

Figure 11A:
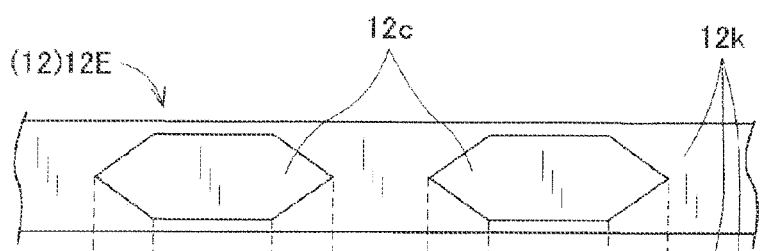
FIGS. 11(a), 11(b), and 11 (c) are partial views which, illustrate modifications of a second rotor of the power transmission mechanism of the sixth example of FIG. 8.
Figure 11B:
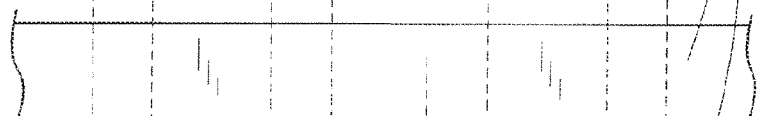
Figure 11C:

The second rotor 12E, as illustrated in FIGS. 11(a) to 11(c), includes the soft-magnetic blocks 12c and a fastener 12k. The fastener 12k is of an annular or hollow cylindrical shape. FIG. 11(a) is a plane view of the second rotor 12E. FIGS. 11(b) and 11(c) are side views which show first and second modifications of the fastener 12k, respectively. The fastener 12k of FIG. 11(b) has formed therein holes extending through a thickness thereof. The soft-magnetic blocks 12c are fit through the holes. The fastener 12k of FIG. 11(c)

is made of, for example, a plate and used as a bridge. The fastener 12k has formed therein, non-through holes such as recesses or concavities in which the soft-magnetic blocks 12c are embedded or fit. The fasteners 12k may be made of material other than non-magnetic material, but preferably made of it.

The fastening mechanisms, as illustrated in FIGS. 9(a) to 11(c) may be used to retain the soft-magnetic blocks 12a, 12b, 12d to 12g of the second rotor 12 or the soft-magnetic blocks 11a to 11d of the first rotor 11. Other arrangements of the power transmission mechanism 10F are identical with those in the first example. The power transmission mechanism 10F is also substantially identical in operation and beneficial effects with the first example. The power transmission mechanism 10F may be modified in the same way as described in the second to fifth examples to achieve the same effects.

Seventh Example

Figure 12:
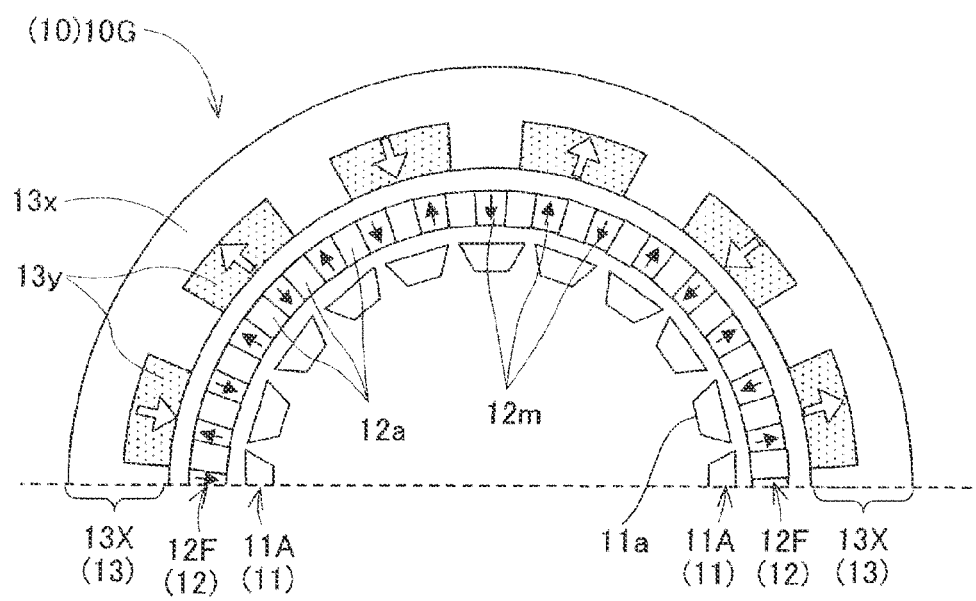
FIG. 12 is a partial transverse sectional view which illustrates a power transmission mechanism of the seventh example according to the first embodiment.

FIG. 12 illustrates the power transmission mechanism 10G which is equipped with the first rotor 11A, the second rotor 12F, and the third rotor 13X. The first rotor 11A, the second rotor 12F, and the third rotor 13X are arranged in this order radially from the inside to the outside of the power transmission mechanism 10G. The third rotor 33X is an example of the third rotor 13 and includes magnets 13y whose number of pole pairs is m and m' soft-magnetic blocks 13x where m'=2m. The magnets 13y and the soft-magnetic blocks 13x are arranged alternately in the circumferential direction of the power transmission mechanism 10G. In the illustrated example, the soft-magnetic blocks 13x are continuously joined together by an annular body of the third rotor 13B, but may alternatively be formed to be discrete. Specifically, the third rotor 13X, as illustrated in FIG. 12, may be made of a single annular soft-magnetic body. The magnets 13y are embedded in the annular soft-magnetic body at given intervals away from each other. In other words, a portion of the annular soft-magnetic body is interposed between every adjacent two of the magnets 13y as one of the soft-magnetic blocks 13x. The second rotor 12F is an example of the second rotor 12 and includes k soft-magnetic blocks 12a and magnets 12m whose number of pole pairs is k' where 2k'=k. The soft-magnetic blocks 12a and the magnets 12m are arranged alternately in the circumferential direction of the power transmission mechanism 10G. In other words, the k soft-magnetic blocks 12a are disposed at intervals away from each other. Similarly, the k magnets 12m are disposed at intervals away from each other. Note that the third rotor 13X may include at least two of the magnets 13y (i.e., permanent magnets) which are magnetized in given directions and have of the soft-magnetic blocks 13x and the at least two of the magnets 13y arranged alternately in the circumferential direction of the third rotor 13X.

As viewed from the magnets 13y of the third rotor 13X which are disposed in a magnetic polo array, the soft-magnetic blocks 11a and 12a of the first and second rotors 11A and 12F serve as magnetic inductor arrays. The number of the magnets 13y, the number of the soft-magnetic blocks 11a, and the number of the soft-magnetic blocks 12a meet a relation of 2m=k-n. In this case, the third rotor 13X serves as a field source to create first magnetic transmission torque. Additionally, as viewed from the magnets 12m of the second rotor 12F which are arranged in a magnetic pole array, the soft-magnetic blocks 11a and 13x of the first and third rotors 11A and 13X serve as magnetic inductor arrays. The number of the magnets 12m, the number of the soft-magnetic blocks 13x, the number of the soft-magnetic blocks 11a meet a relation of 2k'=m'+n. In this case, the second rotor 12F works as a field source to create second magnetic transmission torque. The power transmission mechanism 10G is capable of outputting the sum of the first and second magnetic transmission torques, thereby enhancing the ability of transmitting the power. Other arrangements of the power transmission mechanism 10G are identical with those in the first example. The power transmission mechanism 10G is also substantially identical in operation and beneficial effects with the first example. The power transmission, mechanism 10G may be modified in the same way as described in the second to sixth examples to achieve the same effects.

Eighth Example

Figure 13:
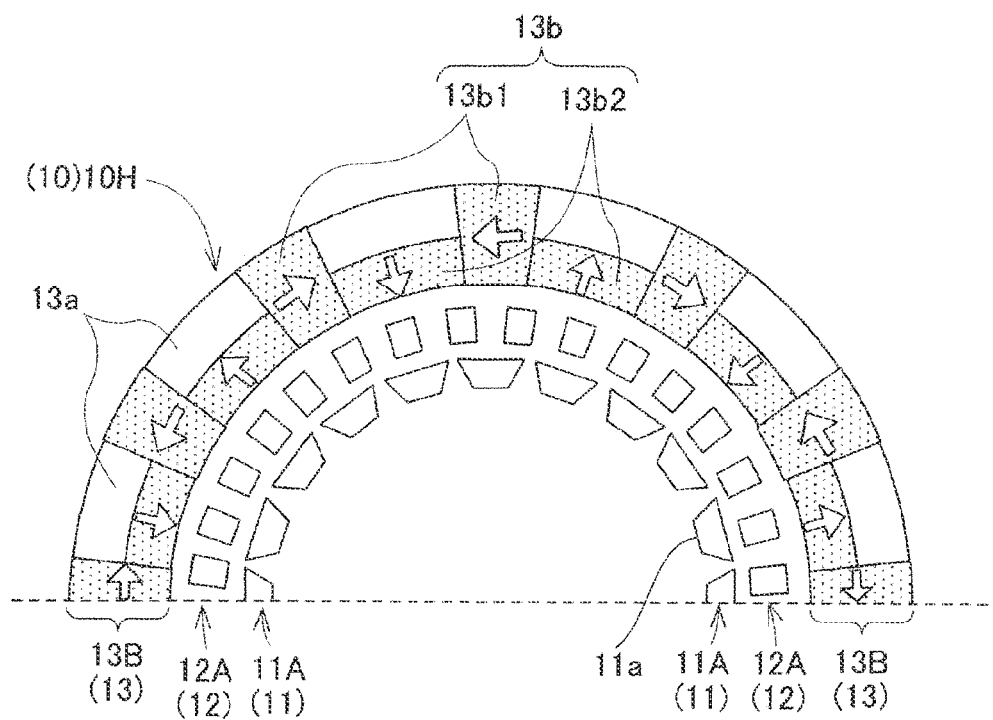
FIG. 13 is a partial transverse sectional view which illustrates a power transmission mechanism of the eighth example according to the first embodiment.

FIG. 13 illustrates the power transmission mechanism 10H which is equipped with the first rotor 11A, the second rotor 12A, and the third rotor 13B. The first rotor 11A, the second rotor 12A, and the third rotor 13B ere arranged in this order radially from the inside to the outside of the power transmission mechanism 10H. The third rotor 13B includes soft-magnetic blocks 13a and magnets 13b whose number of pole pairs is m. The magnets 13b are made up of first magnets 13b1 whose number of pole pairs is m and second magnets 13b2 whose number of pole pairs is m. The first magnets 13b1 and the second magnets 13b2 are arranged alternately in the circumferential direction of the power transmission mechanism 10H (i.e., the circumferential direction of the third rotor 13X). In other words, each of the second magnets 13b2 is disposed between adjacent two of the first magnets 13b1. The boundary or interlace between each of the first magnets 13b1 and adjacent one of the second magnets 13b2 is preferably aligned with the radial direction of the power transmission mechanism 10H. Adjacent two of the first magnets 13b1 are, as indicated by arrows in FIG. 13, magnetized in opposite circumferential directions of the power transmission mechanism 10H. Each adjacent two of the second magnets 13b2 are magnetized in opposite radial directions of the power transmission mechanism 10H. The layout of the magnets 13b in FIG. 13 is generally referred to as a Halbach array. The magnets 13b have increased areas, thus resulting in an increase in magnetic flux, which enhances the ability of transmitting the power. The third rotor 13B may alternatively be made up of a single annular soft-magnetic block 13a and magnets 13b embedded in the soft-magnetic block 13a. In this case, a portion of the soft-magnetic block 13a is interposed between every adjacent two of the magnets 13b1. Other arrangements of the power transmission mechanism 10H are identical with those in the first example. The power transmission mechanism 10H is also substantially identical in operation and beneficial effects with the first example. The power transmission mechanism 10H may be modified in the same way as described in the second to seventh examples to achieve the same effects.

Ninth Example

FIG. 14 illustrates the power transmission mechanism 10I which is equipped with the first rotor 11A, the second rotor 12A, and the third rotor 13C. The first rotor 11A, the second rotor 12A, and the third rotor 13C are arranged in thus order radially from the inside to the outside of the power transmission mechanism 10I. The third rotor 13C includes a soft-magnetic cylinder 13a and magnets 13b whose number of pole pairs is m. The magnets 13b are broken down into magnetic pairs which are embedded in the soft-magnetic cylinder 13a. Each of the magnetic pairs works as one pole. The magnets 13b of each, magnetic pair are arranged away from each other through a small gap (which will also be referred to as a first interval), in other words, located close to each other. The magnets 13b of each magnetic pair are oriented asymmetrically with respect to the radial direction of the power transmission mechanism 10I, so that long sides of each of the magnets 13b intersect with the radial direction of the third rotor 13C at an angle other than 90 degrees. The magnetic pairs of the magnets 13b are arrayed at a second interval away from each other. The second interval is longer than the first interval at which the magnets 13b of each magnetic pair are disposed away from each other. The magnets 13b of each magnetic pair may alternatively be oriented symmetrically with respect to the radial direction of the power transmission mechanism 101, in other words, mirror-image symmetrical about the radial direction of the third rotor 13X.

The magnets 13b are embedded in the soft-magnetic cylinder 13a, thus minimizing the probability that they detach accidentally from the soft-magnetic cylinder 13a when subjected to centrifugal force during rotation of the third rotor 13C. The structure of the power transmission mechanism 101 is, therefore, high in safety. Other arrangements of the power transmission mechanism 10I are identical with those in the first example. The power transmission mechanism 10I is also substantially identical in operation and beneficial effects with the first example. The power transmission mechanism 10I may be modified in the same way as described in the second to eighth examples to achieve the same effects.

Tenth Example

FIG. 15 illustrates the power transmission mechanism 10J which is equipped with the first rotor 11A, the second rotor 12A, and the third rotor 13D. The first rotor 11A, the second rotor 12A, and the third rotor 13D are arranged in this order radially from the inside to the outside of the power transmission mechanism 10J. The third rotor 13A in FIG. 1, as described above, has the magnets 13b whose number of pole pairs is m and which are mounted on the inner circumference of the soft-magnetic cylinder 13a, in other words, arranged to face the second rotor 12A, while the third rotor 13D of this example includes the soft-magnetic cylinder 13a and the magnets 13b which are disposed in the soft-magnetic cylinder 13a at internals away from each other in the circumferential direction of the third rotor 13D. In other words, a portion of the soft-magnetic cylinder 13a is disposed between every adjacent two of the magnets 13b. All the magnets 13b are magnetized in the same direction. The magnets 13b arranged in the layout of FIG. 15 are generally referred to as being of a consequent-pole type.

The magnets 13b are, as indicated by arrows in FIG. 15, all magnetized inwardly toward the center of the third rotor 13D, but however, may alternatively be magnetized in a radially outward direction. Other arrangements of the power transmission mechanism 10J are identical with those in the first example. The power transmission mechanism 10J is also substantially identical in operation and beneficial effects with the first example. The power transmission mechanism 10J may be modified in the same way as described in the second to ninth examples to achieve the same effects.

Eleventh Example

Figure 16A:
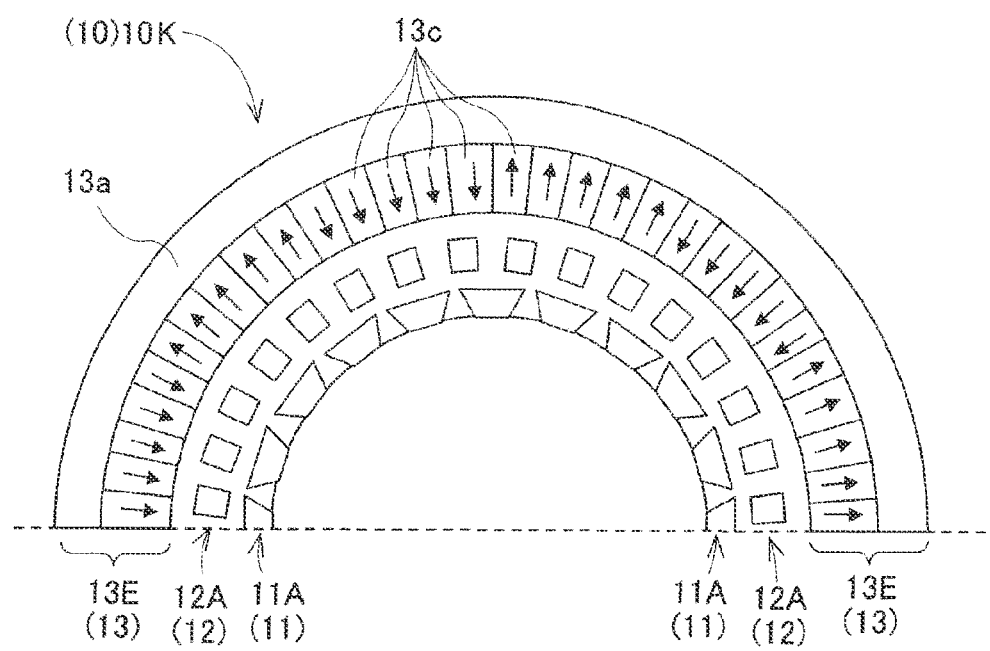
FIG. 16(a) is a partial transverse sectional view which illustrates a power transmission, mechanism of the eleventh example according to the first embodiment.
Figure 16B:
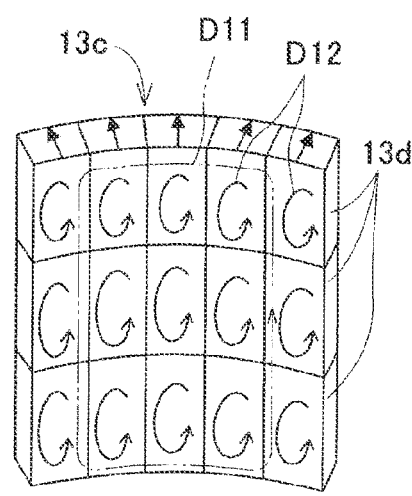
FIG. 16(b) is a partially perspective view which illustrates a structure of a magnet of a third rotor of the power transmission mechanism of FIG. 16(a)

FIGS. 16(a) and 16(b) illustrate the power transmission mechanism 10K which is equipped with the first rotor 11A, the second rotor 12A, and the third rotor 13E. The first rotor 11A, the second rotor 12A, and the third rotor 13E are arranged in this order radially from the inside to the outside of the power transmission, mechanism 10K. The third rotor 13E includes die soft-magnetic cylinder 13a and magnets 13c whose number of pole pairs is m. The magnets 13c are magnetized in directions, as indicated by arrows.

Each of the magnets 13c works as one pole and is, as illustrated in FIG. 16(b), made up of a plurality of magnetic segments 13d. In the illustrated example, the fifteen magnetic segments 13d are arranged continuously in a 3×5 matrix to form one pole. The magnetic segments 13d of each of the magnets 13c are magnetized in the same direction. The number of the magnetic segments 13d of each of the magnets 13c is not limited to fifteen, but may be changed as needed. Additionally, at least one of the magnets 13 may be made up of the plurality of magnetic segments 13d.

Each of the magnetic segments 13d is electrically insulated from the adjacent ones. Specifically, the magnetic segments 13d are isolated from each other through an electrically insulating film or an electrically insulating material. For instance, only mutually lacing side surfaces or whole surfaces of every adjacent two of the magnets 13d may be isolated from each other. The electric insulation among the magnetic segments 13d avoids generation of an eddy current, as indicated by an arrow D11 expressed by a two-dot chain line, but creates eddy currents, as indicate by arrows D12 expressed by solid lines, one in each of the magnetic segments 13d. This eliminates a loss of energy arising from the eddy current, as indicated by the arrow D11.

Other arrangements of the power transmission mechanism 10K are identical with those in the first example. The power transmission mechanism 10K is also, substantially identical in operation and beneficial effects with the first example. The power transmission mechanism 10K may be modified in the same way as described in the second to tenth examples to achieve the same effects.

Twelfth Example

Figure 17:
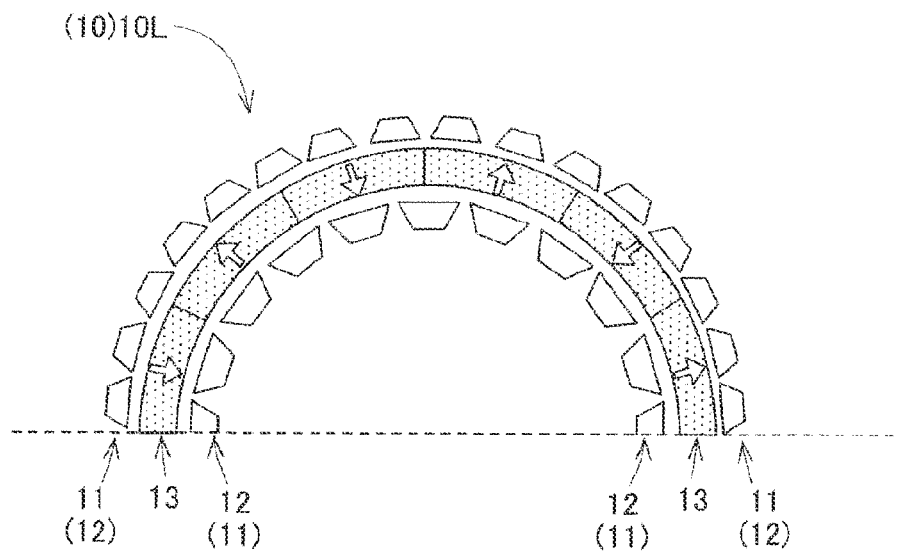
FIG. 17 is a partial transverse sectional view which illustrates a power transmission mechanism of the twelfth example according to the first embodiment.

FIG. 17 illustrates the power transmission mechanism 10L which is equipped with the first rotor 11, the second rotor 12, and the third rotor 13. The second rotor 12, the third rotor 13, and the first rotor 11 are arranged in this order radially from the inside to the outside of the power transmission mechanism 10L. The first rotor 11, the third rotor 13, and the second rotor 12 may alternatively be, as indicated by parentheses, arrayed in this order radially from the inside to the outside of the power transmission mechanism 10L. The power transmission mechanism 10L is designed to have the third rotor 13 interposed between, the first rotor 11 and the second rotor 12.

The first rotor 11 may be implemented by either of the first rotor 11A or the first rotor 11B, as described in the first to eleventh examples. The first rotor 11 may also be made to have any of the structures, as referred to in the sixth example of FIGS. 9(a) to 11(c). Similarly, the second rotor 12 may be implemented by any of the second rotor 12A to 12F, as described in the first to eleventh examples. The third rotor 13 may be implemented by any of the third rotor 13A to 13E, as described in the first to eleventh examples. Other arrangements of the power transmission mechanism 10L are identical with those in the first example. The power transmission mechanism 10L, is also substantially identical in operation and beneficial effects with the first example. The power transmission mechanism 10L may be modified in the same way as described in the second to eleventh examples to achieve the same effects.

Thirteenth Example

Figure 18:
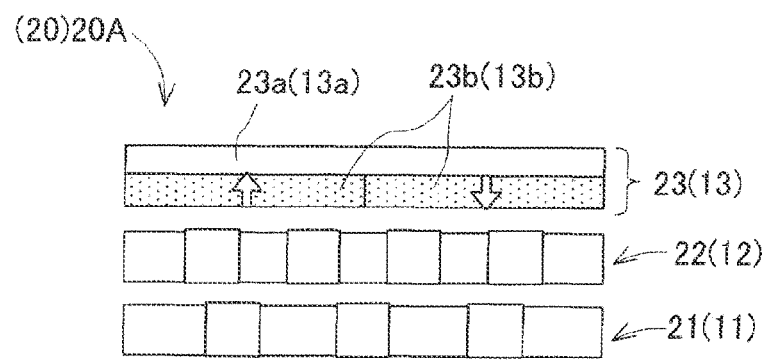
FIG. 18 is a partial plane view which illustrates an axial type of power transmission mechanism of the thirteenth example according to the first embodiment.

FIG. 18 illustrates the power transmission mechanism 20A which is of an axial type. Specifically, the power transmission mechanism 20A has the first rotor 21, the second rotor 22, and the third rotor 23 disposed in this order coaxially with each other. In other words, the first rotor 21, the second rotor 22, and the third rotor 23 are shaped to be arranged coaxially and adjacent each other in a multi-layer form. The first rotor 21 structurally corresponds the first rotor 11 of the radial type of power transmission mechanism, as described above. Similarly, the second rotor 22 structurally corresponds the second rotor 12 of the radial type of power transmission mechanism. The third rotor 23 structurally corresponds the third rotor 13 of the radial type of power transmission mechanism. Specifically, the first rotor 21 may be implemented by either of the first rotor 11A or the first rotor 11B, as described in the first to twelfth examples, winch are modified to be arranged coaxially with the second rotor 22 and the third rotor 23. The second rotor 22 may be implemented by any of the second rotor 12A to 12F, as described in the first to twelfth examples, which are modified to be arranged coaxially with the first rotor 21 and the third rotor 23. The third rotor 23 may be implemented by any of the third rotor 13A to 13E, as described in the first to twelfth examples, which are modified to be arranged coaxially with the first rotor 21 and the second rotor 22. Other arrangements of the power transmission mechanism 20A are identical with those in the first example. The power transmission mechanism 20A is also substantially identical in operation and beneficial effects with the first example.

Fourteenth Example

Figure 19:
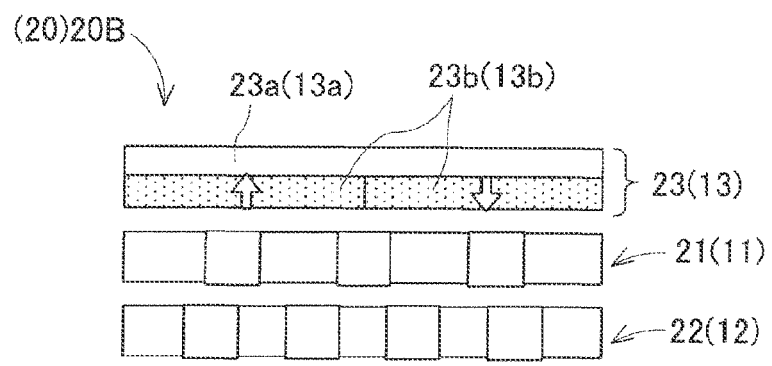
FIG. 19 is a partial plane view which illustrates an axial type of power transmission mechanism of the fourteenth example according to the first embodiment.

FIG. 19 illustrates the power transmission mechanism 20B which is of an axial type. Specifically, the power transmission mechanism 20B has the second rotor 22, the first rotor 21, and the third rotor 23 disposed in this order coaxially with each other. In other words, the second rotor 22, the first rotor 21, and the third rotor 23 are shaped to be arranged coaxially and adjacent each other in a multi-layer form. The power transmission mechanism 20A is different from the thirteenth example only in that the first rotor 21 is disposed between the second rotor 22 and the third rotor 23. Other arrangements of the power transmission mechanism 20B are identical with those in the first example. The power transmission mechanism 20B is also substantially identical in operation and beneficial effects with the first example.

Although not illustrated, the power transmission mechanism 20B may be designed, like the twelfth example, to have the third rotor 32 arranged between the first rotor 21 and the second rotor 22. In other words, the first rotor 21, the third color 23, and the second rotor 22 may be arranged coaxially in this order in a multi-layer form. This structure is also substantially identical in operation and beneficial effects with the first to eleventh examples.

Modification

Figure 20:
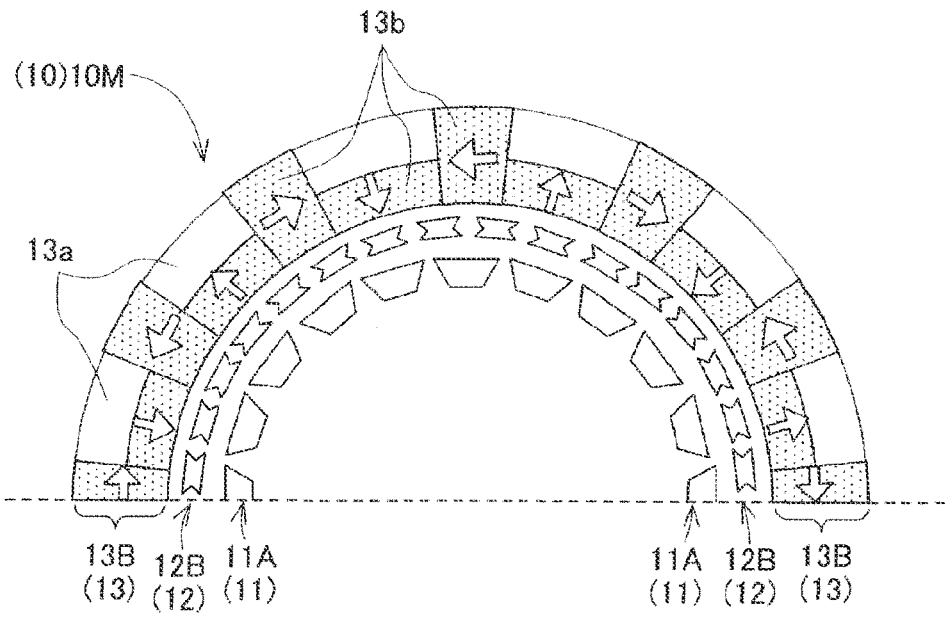
FIG. 20 is a partial transverse sectional view which illustrates a modification of a power transmission mechanism according to the first embodiment.

The radial type of power transmission mechanism 10 may be engineered to have one of all possible combinations of the first rotors 11A and 11B, the second rotors 12A to 12F, and the third rotors 13A to 13E in the first to twelfth examples. One such example is illustrated in FIG. 20. The power transmission mechanism 10M of FIG. 20 is engineered to have the first rotor 11A (i.e., the best rotor 11), the second rotor 12B (i.e., the second rotor 12), and the third rotor 13B (i.e., the third rotor 13). Any of all possible combinations of the first rotors 11A and 11B, the second rotors 12A to 12F, and the third rotors 13A to 13E is identical in operation with and offers substantially same beneficial effects as the first to twelfth examples.

Second Embodiment

FIGS. 21 to 28 illustrate a plurality of examples of an electric rotating machine 100 or 200 according to the second embodiment. The electrical rotating machines 100 and 200 are constructed as, for example, a motor-generator. The electric rotating machines 100A to 100G, as referred to below, are examples of the electric rotating machine 100 which is of a radial type. The electric rotating machine 200A, as referred to below, is an example of the electric rotating machine 200 which is of an axial type. Each of FIGS. 21 to 28 is a schematic view which omits hatching except for shaded magnets for better visibility thereof and illustrates only a half of a traverse section of the electric rotating machine 100 or 200. FIGS. 21 to 28 also omit a winding of an armature. Throughout the drawings, like reference numbers refer to like parts. The explanation of the second and following examples of the second embodiment will omit the same pares as those in the first example for the brevity of disclosure.

First Example

Figure 21:
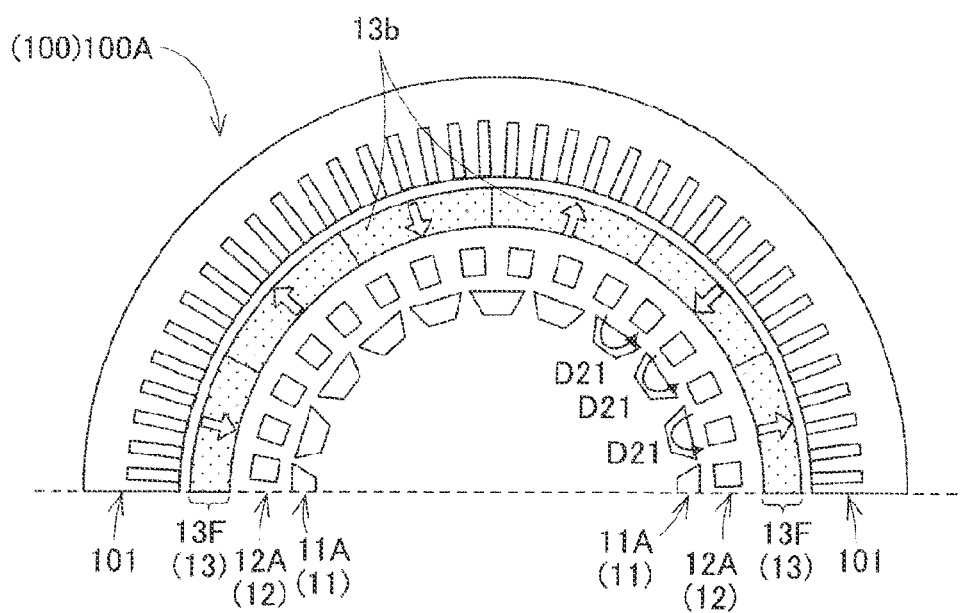
FIG. 21 is a partial transverse sectional view which illustrates an electric restating machine of the first example according to the second embodiment.

The electric rotating machine 100A is, as shown in FIG. 21, of an inner rotor type and includes the first rotor 11A, the second rotor 12A, the third rotor 13F, and the armature 101. The first rotor 11A, the second rotor 12A, and the third rotor 13F, and the armature 101 are arranged in this order radially from the inside to the outside of the electric rotating machine 100A. The third rotor 13F includes the magnets 13b whose number of pole pairs is m and which are arrayed in a circumferential direction of the third rotor 13F. The electric rotating machine 100A is a modification of the power transmission mechanism 10A of FIG. 1. Specifically, the electric rotating machine 100A omits the soft-magnetic cylinder 13a from the third rotor 13A to have the armature 101 in order to ensure a required flow of magnetic flux.

The magnets 13b of the third rotor 13F establish magnetic couplings between the armature 101 and the third rotor 13F and between the third rotor 13F and the second rotor 12A. How to create magnetic torque acting on the first rotor 11A, the second rotor 12A, and the third rotor 13F is the same as in the first example of the first embodiment except that the third rotor 13F is used instead of the third rotor 13A. Between the first rotor 11A which is located most inwardly and the second rotor 12A disposed intermediate between the first rotor 11A and the third rotor 13F, U-shaped flows of magnetic flux, as indicated by arrows D21, are created. This achieves good magnetic modulation, thus enhancing the ability of torque transmission in the electric rotating machine 100A.

Second Example

Figure 22:
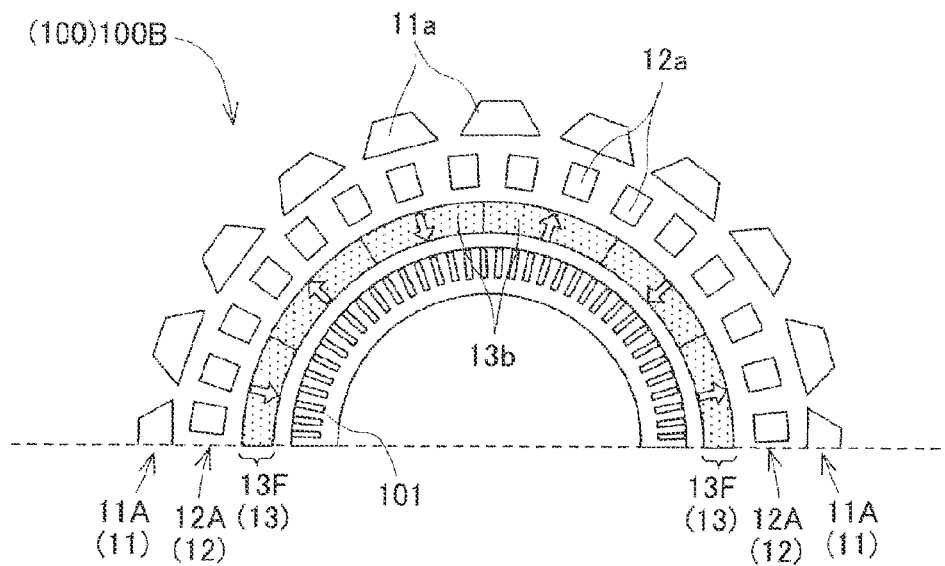
FIG. 22 is a partial transverse sectional view which illustrates an electric rotating machine of the second example according to die second embodiment.

FIG. 22 illustrates the electric rotating machine 100B which is of an outer rotor type. The electric rotating machine 100B is, like the electric rotating machine 100A of FIG. 21, equipped with the first rotor 11A, the second rotor 12A, the third rotor 13F, and the armature 101, but different therefrom in that the first rotor 11A, the second rotor 12A, and the third rotor 13F, and the armature 101 are arranged in this order radially from the outside to the inside of the electric rotating machine 100B. Other arrangements of the electric rotating machine 100B are identical with those in the first example of FIG. 21. The electric rotating machine 100B is also substantially identical in operation and beneficial effects with the first example.

Third Example

Figure 23:
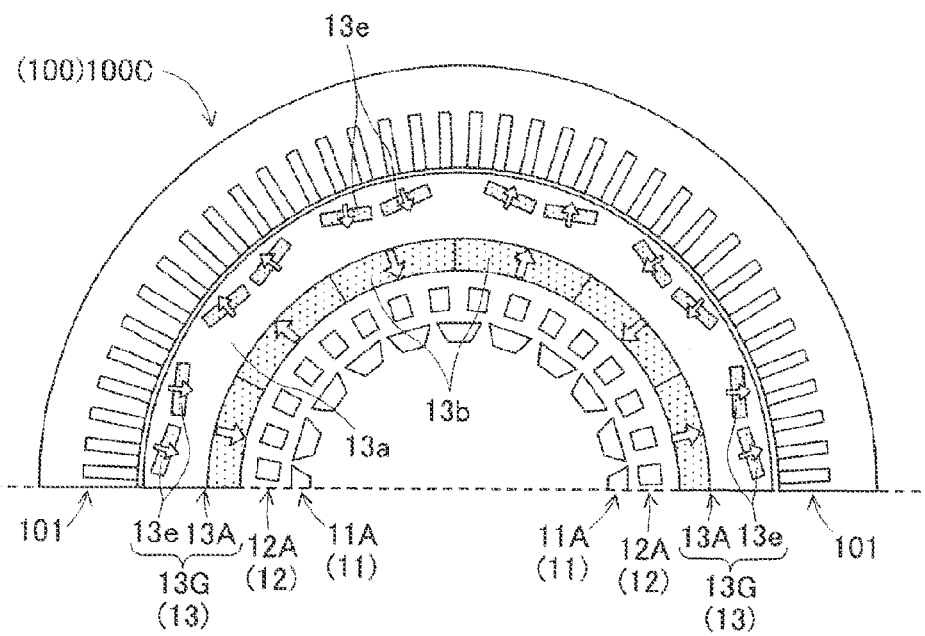
FIG. 23 is a partial transverse sectional view which illustrates an electric rotating machine of the third example according to the second embodiment.

FIG. 23 illustrates the electric rotating machine 100C which is of an inner rotor type. The electric rotating machine 100C is equipped with the first rotor 11A, the second rotor 12A, the third rotor 13G, and the armature 101. The first rotor 11A, the second rotor 12A, the third rotor 13G, and the armature 101 are arranged radially in this order from the inside to the outside of the electric rotating machine 100C.

The third rotor 13G has a plurality of magnets 13e embedded in an outer circumferential portion of the soft-magnetic cylinder 13a. The layout of the magnets 13e is the same as that of the magnets 13b in FIG. 14. The magnets 13e establish a magnetic connection between the third rotor 13G and the armature 101 to transmit the power or torque therebetween. The third rotor 13G is, as can be seen in the drawing, made by a combination of the third rotor 13A and the magnets 13e. The third rotor 13A, as described above, has the magnets 13b. The magnets 13b work to establish a magnetic connection between the third rotor 13G and the second rotor 12A to transmit the torque therebetween. Although not illustrated, the same flows of magnetic flux as those in FIG. 21 are created, thus providing the same operation and beneficial effects as those in the first example.

Although not illustrated, the electric rotating machine 100C, like the second example of FIG. 22, may be of an outer rotor type which is designed to have the first rotor 11A, the second rotor 12A, the third rotor 13G, and the armature 101 arranged in this order radially from the outside to the inside thereof. Other arrangements are identical with those in the first example of FIG. 21. The structure of the third example is also substantially identical in operation and beneficial effects with the first example.

Fourth Example

Figure 24:
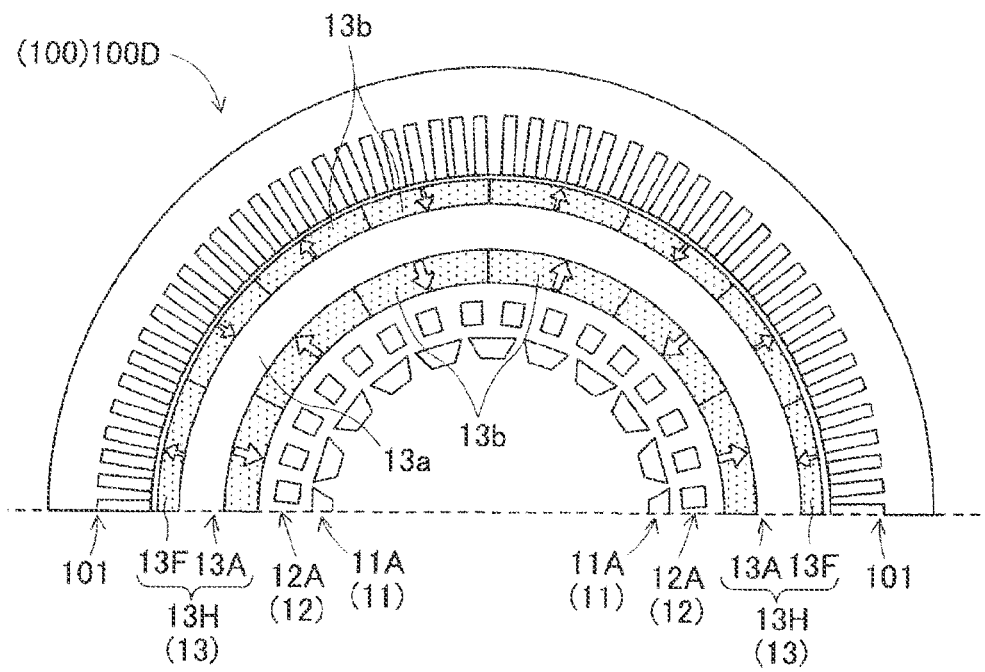
FIG. 24 is a partial transverse sectional view which illustrates an electric rotating machine of the fourth example according to the second embodiment.

FIG. 24 illustrates the electric rotating machine 100D which is of an inner rotor type. The electric rotating machine 100D is equipped with the first rotor 11A, the second rotor 12A, the third rotor 13H, and the armature 101. The first rotor 11A, the second rotor 12A, the third rotor 13H, and the armature 101 are arranged in this order radially from the inside to the outside of the electric rotating machine 100D.

The third rotor 13H is formed by a combination of the third rotor 13A of FIG. 1 and the third rotor 13F of FIG. 21. The third rotor 13A in this example is disposed on the inner circumferential side of the third rotor 13H and faces the second rotor 12A. The third rotor 13F is disposed on the outer circumferential side of the third rotor 13H so that it faces the armature 101. The magnets 13b of the third rotor 13F establish a magnetic connection between the third rotor 13H and the armature 101 to transmit the power or torque therebetween. The magnets 13b of the third rotor 13A work to establish a magnetic connection, between the third rotor 13H and the second rotor 12A to transmit the torque therebetween. Although not illustrated, the same flows of magnetic flux as those in FIG. 21 are created, thus providing the same operation and beneficial effects as those in the first example of FIG. 21.

Although not illustrated, the electric rotating machine 100D, like the second example of FIG. 22, may be of an outer rotor type which is designed to have the first rotor 11A, the second rotor 12A, the third rotor 13H, and the armature 101 arranged in this order radially from the outside to the inside thereof. Other arrangements are identical with those in the first example of FIG. 21. The structure of the third example is also substantially identical in operation and beneficial effects with the first example.

Fifth Example

Figure 25:
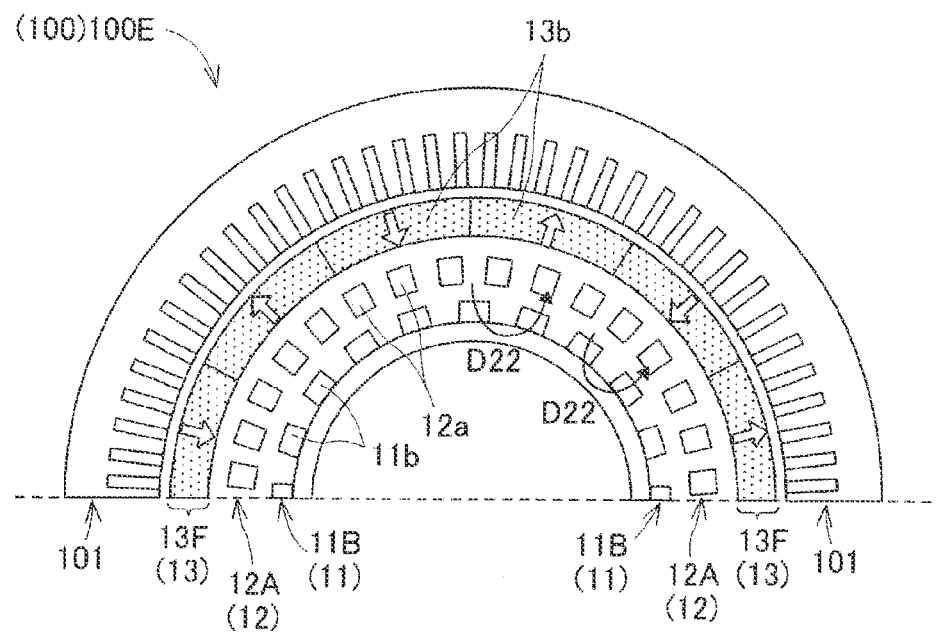
FIG. 25 is a partial transverse sectional view which illustrates an electric rotating machine of the fifth example according to the second embodiment.

FIG. 25 illustrates the electric rotating machine 100E which is of an inner rotor type and equipped with the first rotor 11B, the second rotor 12A, the third rotor 13F, and the armature 101. The first rotor 11B, the second rotor 12A, the third rotor 13F, and the armature 101 are arranged in this order radially from the inside to the outside of the electric rotating machine 100E. This structure is substantially identical with that of the power transmission mechanism 10D of the fourth example of the first embodiment. Although not illustrated, the same flows of magnetic flux as those in FIG. 21 are created, thus providing the same operation and beneficial effects as those in die first example of FIG. 21.

Although not illustrated, the electric rotating machine 100E, like the second example of FIG. 22, may be of an outer rotor type which is designed to have the first rotor 11B, the second rotor 12A, the third rotor 13F, and the armature 101 arranged in this order radially from the outside to the inside thereof. Other arrangements are identical with those in the first example of FIG. 21. The structure of the fifth example is also substantially identical in operation and beneficial effects with the first example.

Sixth Example

Figure 26:
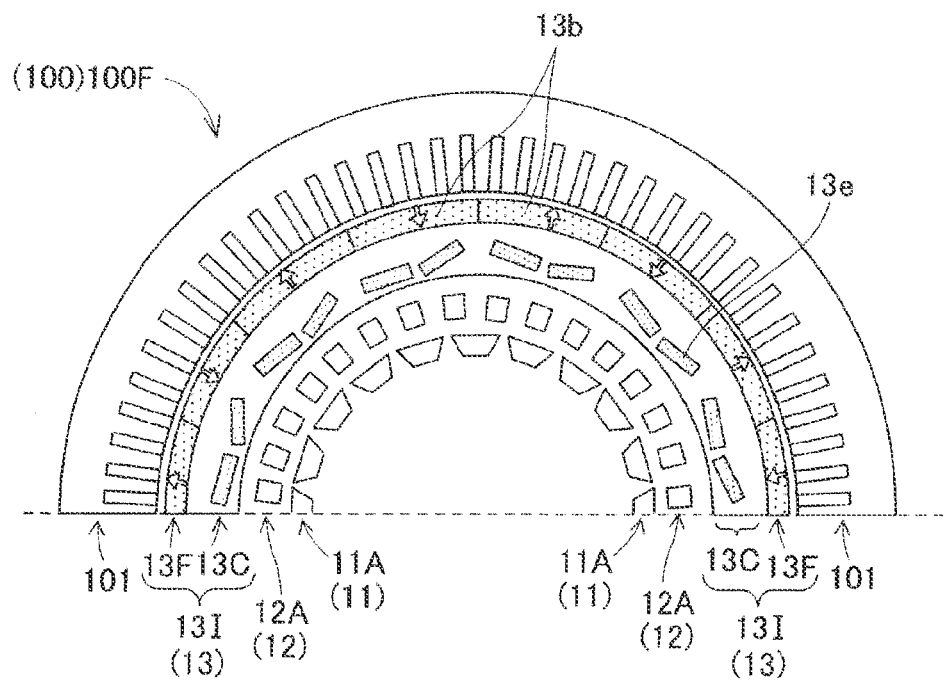
FIG. 26 is a partial transverse sectional view which illustrates an electric rotating machine of the sixth example according to the second embodiment.

FIG. 26 illustrates the electric rotating machine 100F which is of an inner rotor type and equipped with, the first rotor 11A, the second rotor 12A, the third rotor 13I, and the armature 101. The first rotor 11A, the second rotor 12A, the third rotor 13I, and the armature 101 are arranged in this order radially from the inside to the outside of the electric rotating machine 100F.

The third rotor 13I is formed by a combination of the third rotor 13A of FIG. 1, the third rotor 13C of FIG. 14, and the third rotor 13F of FIG. 21. The third rotor 13C in this example is disposed on the inner circumferential side of the third rotor 13I and faces the second rotor 2A. The third rotor 13F in this example is disposed on the outer circumferential side of the third rotor 13I and faces the armature 101. The magnets 13b of the third rotor 13F establish a magnetic connection between the third rotor 13I and the armature 101 to transmit the power or torque therebetween. The magnets 13e of the third rotor 13C work to establish a magnetic connection between the third rotor 13I and the second rotor 12A to transmit the torque therebetween. Although not illustrated, the same flows of magnetic flux as those in FIG. 21 are created, thus providing the same operation and beneficial effects as those in the first example of FIG. 21.

Although not illustrated, the electric rotating machine 100F, like the second example of FIG. 22, may alternatively be of an other rotor type which is designed to have the first rotor 11A, the second rotor 12A, the third rotor 13I, and the armature 101 arranged in this order radially from the outside to die inside thereof. Other arrangements are identical with those in the first example of FIG. 21, The structure of the sixth example is also substantially identical in operation and beneficial effects with the first example.

Seventh Example

Figure 27:
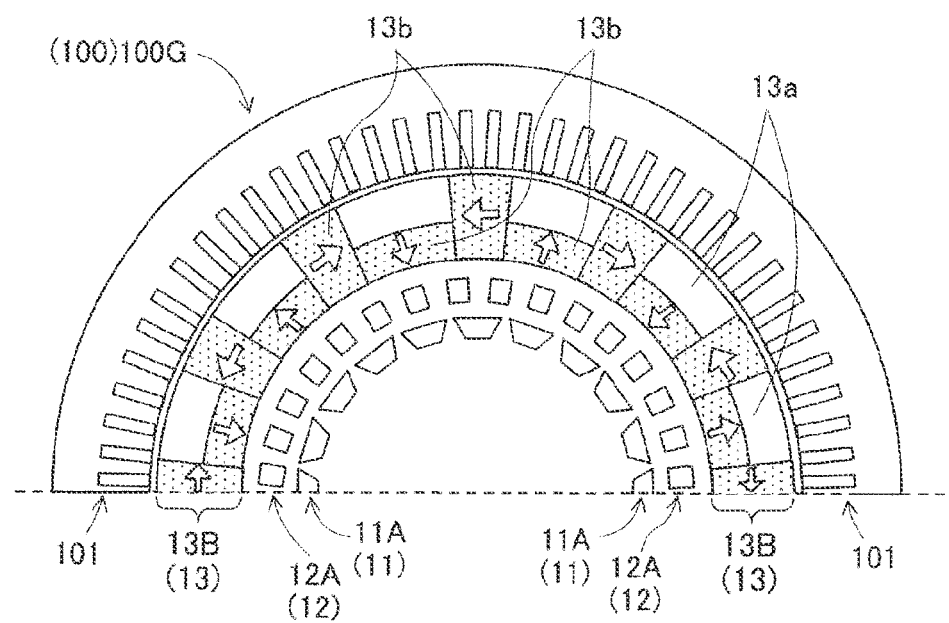
FIG. 27 is a partial transverse sectional view which illustrates an electric rotating machine of the seventh example according to the second embodiment.

FIG. 27 illustrates the electric rotating machine 100G which is of an inner rotor type and equipped with the first rotor 11A, the second rotor 12A, the third rotor 13B, and the armature 101. The first rotor 11A, the second rotor 12A, the third rotor 13B, and the armature 101 are arranged in this order radially from the inside to the outside of the electric rotating machine 100G. The third rotor 13B, like the one in FIG. 13, has the magnets 13b disposed in a Halbach array.

Although not illustrated, the same flows of magnetic flux as those in FIG. 21 are created, thus providing the same operation and beneficial effects as those in the first example of FIG. 21.

Although not illustrated, the electric rotating machine 100G, like the second example of FIG. 22, may alternatively be of an outer rotor type which is designed to have the first rotor 11A, the second rotor 12A, the third rotor 13B, and the armature 101 arranged in this order radially from the outside to the inside thereof. Other arrangements are identical with those in the first example of FIG. 21. The structure of the seventh example is also substantially identical in operation and beneficial effects with the first example.

Eighth Example

Figure 28:
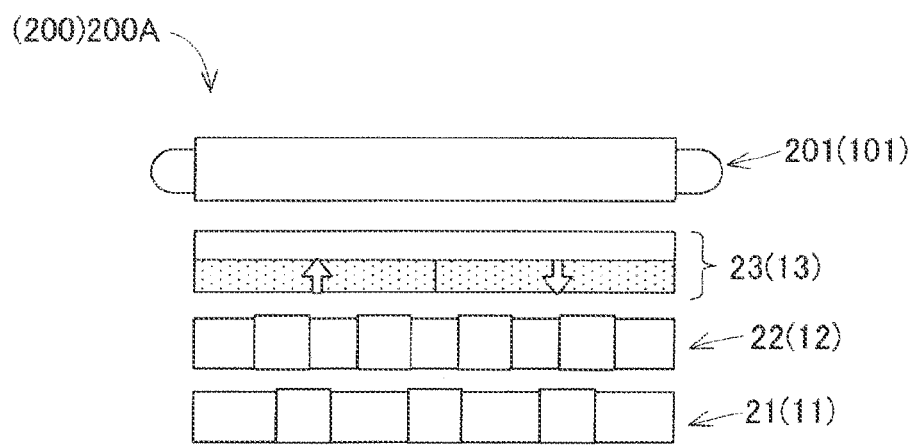
FIG. 28 is a partial plane view which illustrates an axial type of electric rotating machine of the eighth, example according to the second embodiment.

FIG. 28 illustrates the electric rotating machine 200A which is of an axial, type. Specifically, the electric rotating machine 200A has the first rotor 21, the second rotor 22, the third rotor 23, and the armature 201 disposed in this order coaxially with each other. In other words, the first rotor 21, the second rotor 22, the third rotor 23, and the armature 201 are shaped to be arranged coaxially and adjacent each other in a multi-layer form.

The first rotor 21 structurally corresponds the first rotor 11 of the radial type of electric rotating machine, as described above. Similarly, the second rotor 22 structurally corresponds the second rotor 12 of the radial type of electric rotating machine. The third rotor 23 structurally corresponds the third rotor 13 of the radial type of electric rotating machine. In other words, the electric rotating machine 200A may be engineered to have one of all possible combinations of the first rotors 11A and 11B, the second rotors 12A to 12F, and the third rotors 13A to 13E, as used in the first and second embodiments, which are modified to be arranged coaxially in the multi-layer form. The structure of the eighth example is substantially identical in operation and beneficial effects with the first to seventh examples.

Although not illustrated, the electric rotating machine 200A, like the thirteenth example in the first embodiment, may alternatively be designed to have the second rotor 22 disposed outside the first rotor 21. This structure is also substantially identical in operation and beneficial effects with the first example.

Modification

The radial type of electric rotating machine 100 may be engineered to have one of all possible combinations of the rotors, as described above, and the armature 101 or 201 mounted adjacent the third rotor 13. Specifically, the electric rotating machine 100 may include one of all possible combinations of the first rotors 11A and 11B, the second rotors 12A to 12F, and the third rotors 13A to 13E in the first to twelfth examples of the first embodiment. Some such combinations hove been discussed in the first to seventh examples of the second embodiment. The axial type of electric rotating machine 200 may also be designed to include a combination of the first rotor 21, the second rotor 22, and the third rotor 23 and have the armature 201 disposed to face the third rotor 23. One such combination has been discussed In the eighth example of the second embodiment. Any and all possible combinations of the above described rotors is identical in operation with and offers substantially the same beneficial effects as the first to twelfth examples of the first embodiment or the first to seventh examples of the second embodiment.

Third Embodiment

FIGS. 29 to 32 illustrate a plurality of examples of a power generator 500 engineered as a power unit for vehicles such as automobiles according to the third embodiment. The power generators 500A to 500D, as referred to below, are examples of the power generator 500 which are equipped with the radial type of electric rotating machine 100, as described above. Each of FIGS. 29 to 32 is a schematic view which is simplified in the same way, as referred to in the first and second embodiments, for better visibility thereof. Throughout the drawings, like reference numbers refer to like parts. The power transmitting members 501 to 503 and 506 to 513, as discussed below, may be made of any material as long as they are connectable with rotors of the power generator 500. For instance, the power transmitting members 501 to 503 and 506 to 513 may be implemented by one or a combination of a rotary shaft, a cam, a ring, a crank, a belt, a gear, a rack-and-pinion, and a torque converter.

First Example

Figure 29:
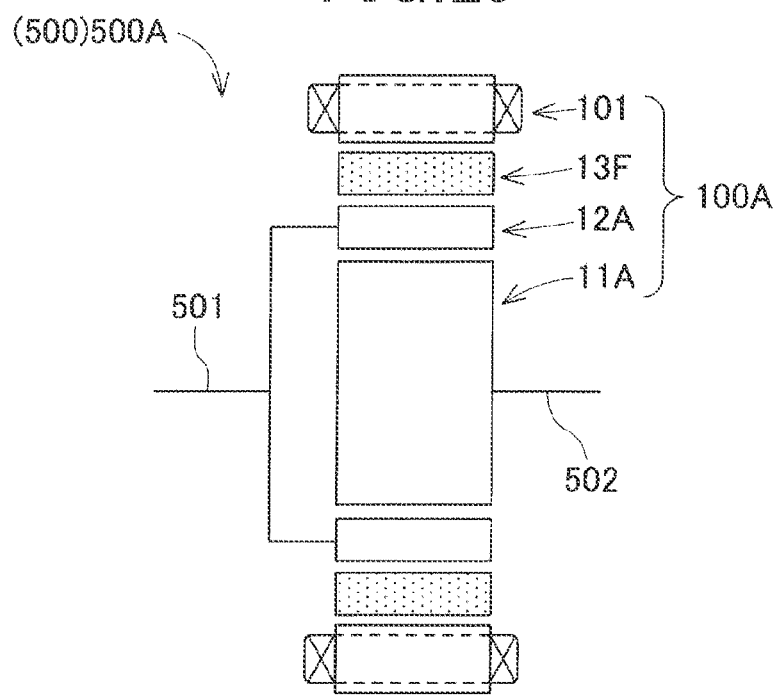
FIG. 29 is a schematic view which illustrates an automotive power generator of the first example according to the third embodiment.

The power generator 500A is, as illustrated in FIG. 29, equipped with the electric rotating machine 100A of FIG. 21 and the power transmitting members 501 and 502. The power transmitting member 501 works as a first power transmitting member joined to the second rotor 12A to transmit the power only from or to the second rotor 12A or bi-directionally between itself and the second rotor 12A. The power transmitting member 502 works as a second power transmitting member joined to the first rotor 11A to transmit the power only from or to the first rotor 11A or bi-directionally between itself and the first rotor 11A. One of the power transmitting members 501 and 502 is mechanically connected to the engine Eg such as an internal combustion engine illustrated in FIG. 32. The other of the power transmitting members 501 and 502 is mechanically connected to the axle 515 to which road wheels Wh are attached. The armature 101 is energized in response to a control signal Sig, as outputted from the rotation controller 520, to control rotation of the rotors (mainly the speed of die; third rotor 13F). Even when the armature 101 is not operating or is deenergized, the first rotor 11A and the second rotor 12A are magnetically coupled together, thus enabling the power or torque to be transmitted therebetween.

The power transmitting mechanism 10 (i.e., the power transmitting mechanisms 10A to 10M), as referred to in the first embodiment, may be engineered to have either or both of the power transmitting members 501 and 502 coupled to the second rotor 12 and the first rotor 11. Similarly, the electric rotating machine 100 (i.e., the electric rotating machines 100A to 100G), as referred to in the second embodiment, may be designed to have the same structure, as illustrated in FIG. 29, except for the rotation controller 520. The same applies to the second to the fourth examples, as will be described below.

Although not illustrated, the power transmitting member 501 may alternatively be joined to the first rotor 11A or the third rotor 13F. Similarly, the power transmitting member 502 may alternatively be joined to the second rotor 12A or the third rotor 13F. In either case, the power is enabled to be transmitted between magnetically coupled two of the rotors 11A, 12A, and 13F.

Second Example

Figure 30:
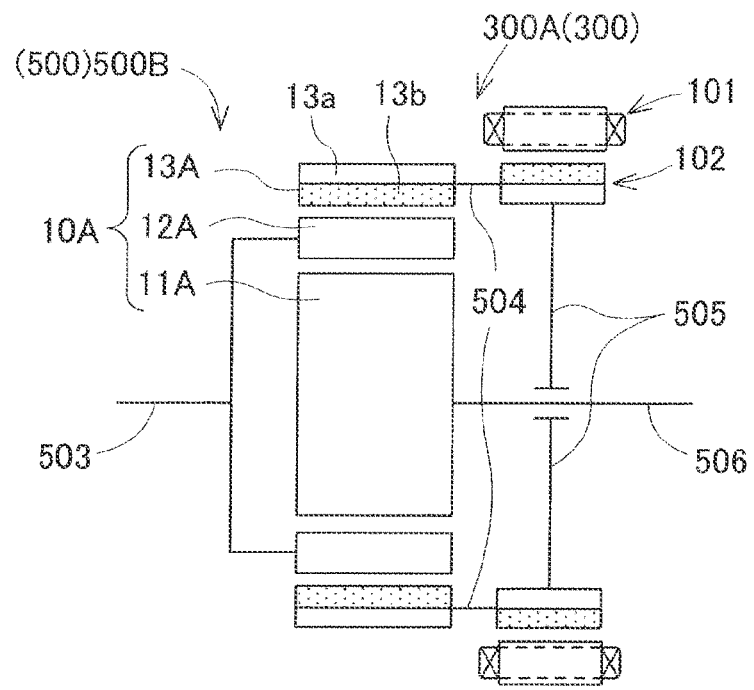
FIG. 30 is a schematic view which illustrates an automotive power generator of the second example according to the third embodiment.

The power generator 500B is, as illustrated in FIG. 30, equipped with the electric rotating machine 300A and the power transmitting members 503 and 506. The electric rotating machine 300A is an example of the electric rotating machine 300 and includes the power transmitting mechanism 10A of FIG. 1, the rotor 102, and the armature 101. The rotor 102 is basically identical in structure with the third rotor 13A except that the soft-magnetic cylinder 13a is disposed radially inside the magnets 13b. The third rotor 13A and the rotor 102 are disposed adjacent each other in an axial direction of the power generator 500B (i.e., a lateral direction in FIG. 30) and coupled together by the connecting member 504. The first rotor 11A, the second rotor 12A, and the third rotor 13A are arranged radially (i.e., the vertical direction in FIG. 30). The power transmission mechanism 10A and the rotor 102 are arranged axially (i.e., the lateral direction in FIG. 30).

The power transmitting member 503 works as the first power transmitting member joined to the second rotor 12A. The power transmitting member 506 works as the second power transmitting member joined to the first rotor 11A. One of the power transmitting members 503 and 506 is mechanically connected to the engine Eg in FIG. 32. The other of the power transmitting members 503 and 506 is mechanically connected to the axle 515 to which road wheels Wh are attached. The connecting member 504, as described above, connects between the third rotor 13A and the rotor 102. The connecting member 503 supports the rotor 102 to be rotatable relative to the power transmitting member 506. The armature 101 is disposed so as to face the rotor 102. The armature 101 is energized in response to the control signal Sig, as outputted from the rotation controller 520, to control rotation of the rotors (mainly the rotor 102). Even when the armature 101 is not operating or is deenergized, the first rotor 11A and the second rotor 12A are magnetically coupled together, thus enabling the power or torque to be transmitted therebetween.

Although not illustrated, the power transmitting member 503 may alternatively be joined to the first rotor 11A or the third rotor 13A (or the rotor 102). Similarly, the power transmitting member 502 may alternatively be joined to the second rotor 12A or the third rotor 13A (or the rotor 102). A soft-magnetic material may also be disposed between the third rotor 13A and the rotor 102 to unite them together. This eliminates the need for the connecting member 504. In either ease, the power is enabled to be transmitted between magnetically coupled two of the rotors 11A, 12A, and 13A.

Third Example

Figure 31:
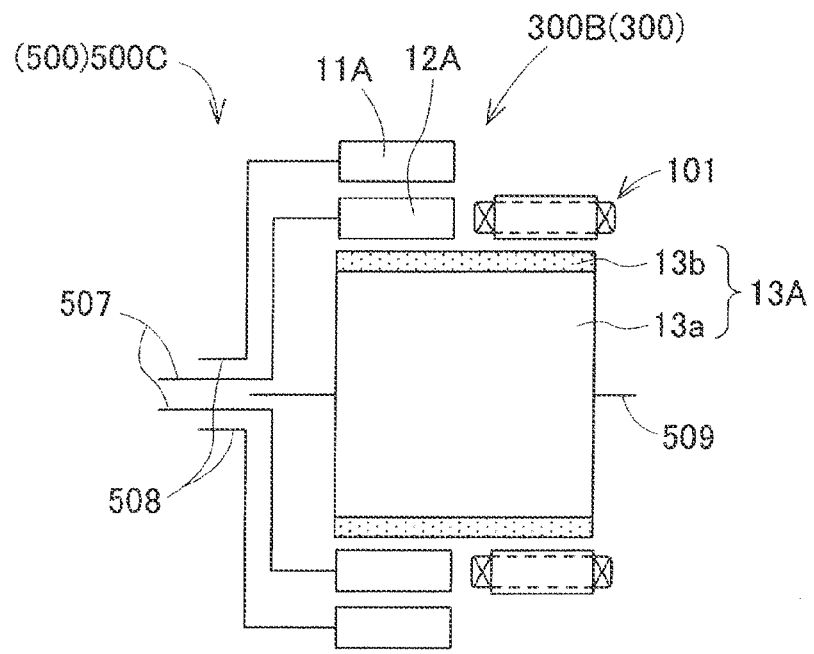
FIG. 31 is a schematic view which illustrates an automotive power generator of the third example according to the third embodiment.

The power generator 500C is, as illustrated in FIG. 31, equipped with the electric rotating machine 300B and the power transmitting members 507, 508, and 509. The electric rotating machine 300B is an example of the electric rotating machine 300 and includes the first rotor 11A, the second rotor 12A, the third rotor 13A, and the armature 101. The first rotor 11A, the second rotor 12A, the third rotor 13A base substantially the same structures as those of the power transmission mechanism 10B in FIG. 2, respectively, and joined in the same way as in the power transmission mechanism 108. The third rotor 13A is, however, shaped to be longer than the one in FIG. 2 in the axial direction (i.e., the lateral direction in FIG. 31) of the electric rotating machine 300B. Additionally, the armature 101 is axially disposed adjacent the first rotor 11A and the second rotor 12A. The first rotor 11A is joined to the power transmitting member 508. The second rotor 12A is joined to the power transmitting member 507. The power transmitting members 507 and 508 are arranged coaxially with each other. The third rotor 13A is joined to the power transmitting member 509.

The power transmitting members 807 and 508 serve as the first power transmitting member. The power transmitting member 509 serves as the second power transmitting member. At least one of the power transmitting members 507, 508, and 509 is mechanically connected to the engine Eg in FIG. 32. The others of the power transmitting members 507, 508, and 509 are mechanically connected to the axle 515 to which road wheels Wh are attached. The armature 101 is energized in response to the control signal Sig, as outputted from the rotation controller 520, to control rotation of the rotors (mainly the third rotor 13A). Even when the armature 101 is not operating or is deenergized, the first rotor 11A and the second rotor 12A are magnetically coupled together, thus enabling the power or torque to be transmitted therebetween.

Although not illustrated, the power transmitting member 507 may alternatively be joined to the first rotor 11A or the third rotor 13A. Similarly, the power transmitting member 508 may alternatively be joined to the second rotor 12A or the third rotor 13A. The power transmitting member 509 may alternatively be joined to the first rotor 11A or the second rotor 12A. In either case, the power is enabled to be transmitted between magnetically coupled two of the rotors 11A, 12A, and 13A.

Fourth Example

Figure 32:
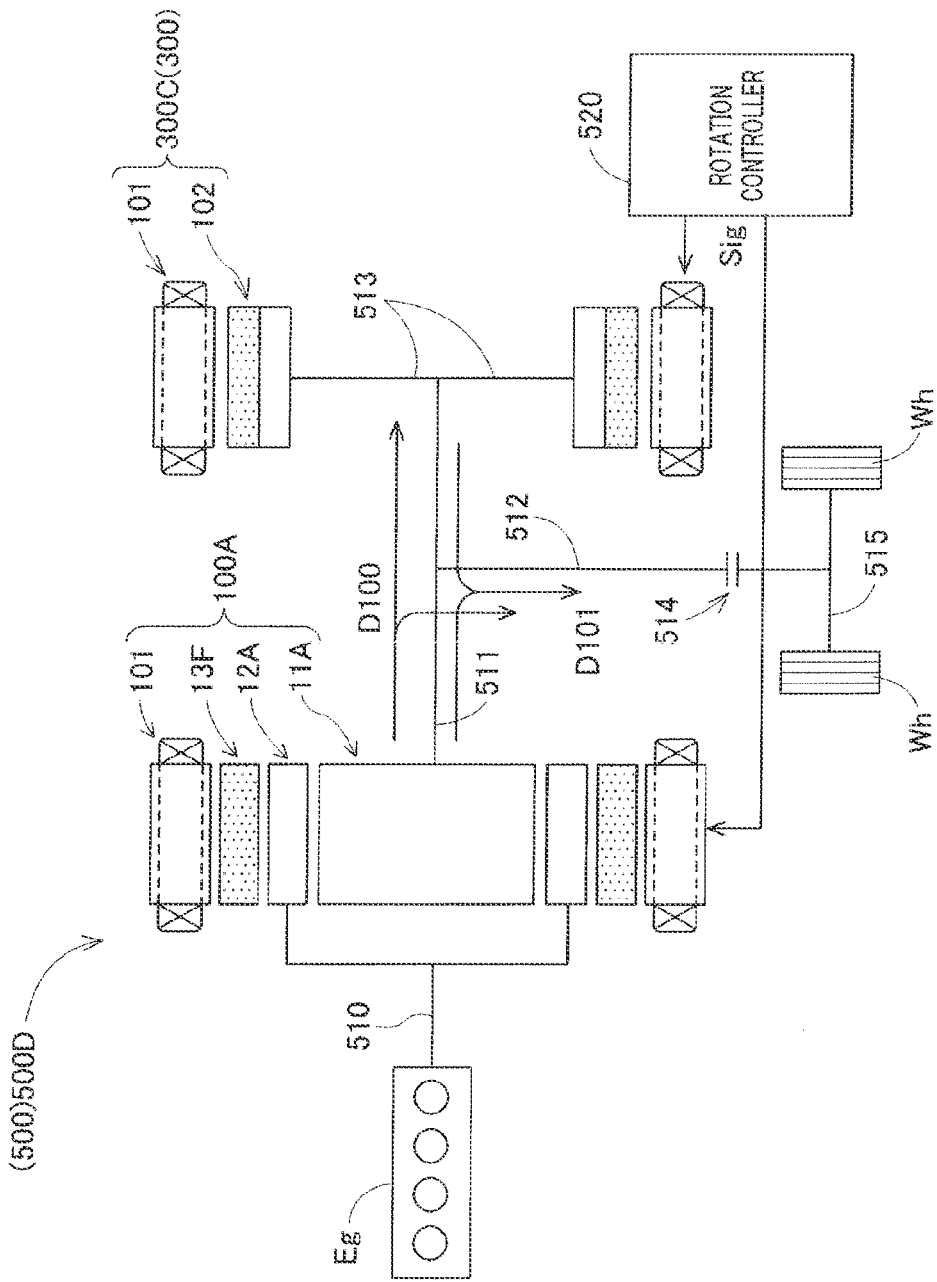
FIG. 32 is a schematic view which illustrates an automotive power generator of the fourth example according to the third embodiment.

The power generator 500D is, as illustrated in FIG. 32, equipped with the electric rotating machine 100A of FIG. 21, the electric rotating machine 300C, and the power transmitting members 510, 511, 513, and 513. The electric rotating machines 100A and the 300C are driven independently from each other in response to the control signals Sig transmitted from the rotation controller 520. The layout of the electric-rotating machines 100A and 300C is not limited to the illustrated one. The power generator 500D may also be equipped with an additional electric rotating machine(s).

The second rotor 12A of the electric rotating machine 100A is joined to the engine Eg through the power transmitting member 510. The first rotor 11A is connectable to the electric rotating machine 300C through the power transmitting members 511 and 513 and also to the axle 515 through the power transmitting members 511 and 512. The gear 514 is mounted between the power transmitting member 512 and the axle 515. The axle 515 has the wheels Wh affixed thereto. The electric rotating machine 300C is equipped with the rotor 102 ad the armature 101, as illustrated in FIG. 30. The power transmitting member 510 serves as the first power transmitting member. The power transmitting member 511 serves as both the second power transmitting member and the third power transmitting member. The power transmitting member 512 serves as the third power transmitting member.

The transmission of power when the engine Eg and/or the electric rotating machine 100A is driven will be described below.

When the engine Eg is run, the power, as generated thereby, is transmitted to the second rotor 12A, so that it rotates. This causes the power to be transmitted from the second rotor 12A to the first rotor 11A. When the electric rotating machine 100A is driven, the power, as produced by the armature 101, works to rotate the third rotor 13F, so that the power is transmitted to the first rotor 11A. The power, as inputted to the first rotor 11A, is enabled to be transferred to the electric rotating machine 300C or the wheels Wh through one of lines, as indicated by arrows D100. Specifically, when the first rotor 11A is mechanically connected to the power transmitting members 511 and 513, the power, as outputted from the first rotor 11A, works to rotate the rotor 102, so that the electric rotating machine 300C operates in an electric power generation mode. The electric power may be then stored in a battery. When the first rotor 11A is mechanically connected to the power transmitting members 511 and 512, the power, as outputted from the first rotor 11A, works to rotate the wheels Wh through the axle 515.

The transmission of power when the engine Eg and the electric rotating machine 300A are driven will he described below.

The power generated by the engine Eg is, as described above, transmitted to the power transmitting member 511. The power, as produced lay the armature 101 of the electric rotating machine 300C, works to rotate the rotor 102, so that the power is transmitted to the power transmitting member 513. The power, as inputted to the power transmitting member 511, and the power, as inputted to the power transmitting member 513, are combined together. Such resultant power is transmitted to the wheels Wh through the power transmitting member 512 and the axle 515. The electric rotating machine 100A may be energized simultaneously in the motor mode. In this case, the power, as outputted from the electric rotating machine 100A, is added to the above resultant power. When being placed in the deenergized state, the electric rotating machine 100A may be used in the electric power generation mode.

The transmission of power when the electric rotating machine 100A and/or the electric rotating machine 300A is driven will be described below.

When it is required to start the engine Eg, the electric rotating machine 100A is energized. The power, as generated by the armature 101 of the electric rotating machine 100A, works to rotate the third rotor 13F. The power of the third rotor 13F is then transmitted to the power transmitting member 510 through the second rotor 12A and to the engine Eg, so that the engine Eg is started. The electric rotating machine 100A, therefore, works as an engine starter. When it is required to actuate the electric rotating machine 300C, the armature 101 of the electric rotating machine 300C is energized. The power, as produced by the armature 101 of the electric rotating machine 300C, is transmitted to the power transmitting member 513 through the rotor 102. The electric rotating machine 300C, therefore, works in the motor mode to drive the vehicle. As apparent from the above discussion, the system equipped with the rotation controller 520, as illustrated in the FIG. 32, works to actuate the engine Eg, the electric/rotating machine 100A, and/or the electric rotating machine 300C in the way, as described above, to establish the transmission of power or torque through the power transmitting members 511 to 513 to start the engine Eg, generate the electric power, and/or run the wheels Wh as required.

Modification

The radial type of electric rotating machine 100 or 300 may be engineered to have one of all possible combinations of the rotors, as described above, and the armature 101 mounted adjacent the third rotor 13. Specifically, the electric rotating machine 100 may include one of all possible combinations of the first rotors 11A and 11B, the second rotors 12A to 12F, and the third rotors 13A to 13E in the first to twelfth examples of the first embodiment. Some such combinations have been discussed in the first to seventh examples of the second embodiment. The axial type of electric rotating machine 200 may be employed in addition to or instead of the radial type of electric rotating machines 100 and 300. The electric rotating machine 200 may be designed to include a combination of the first rotor 21, the second rotor 22, and the third rotor 23 and have the armature 201 disposed to face the third rotor 23. In other words, the power generator 500 for vehicles may be engineered to include one of all possible combinations of the electric rotating machines, as described above. In either modification, the power generator 500 offers substantially same beneficial effects as the first to twelfth examples of the first embodiment or the first to seventh examples of the second embodiment.

Other Embodiments

Figure 33:
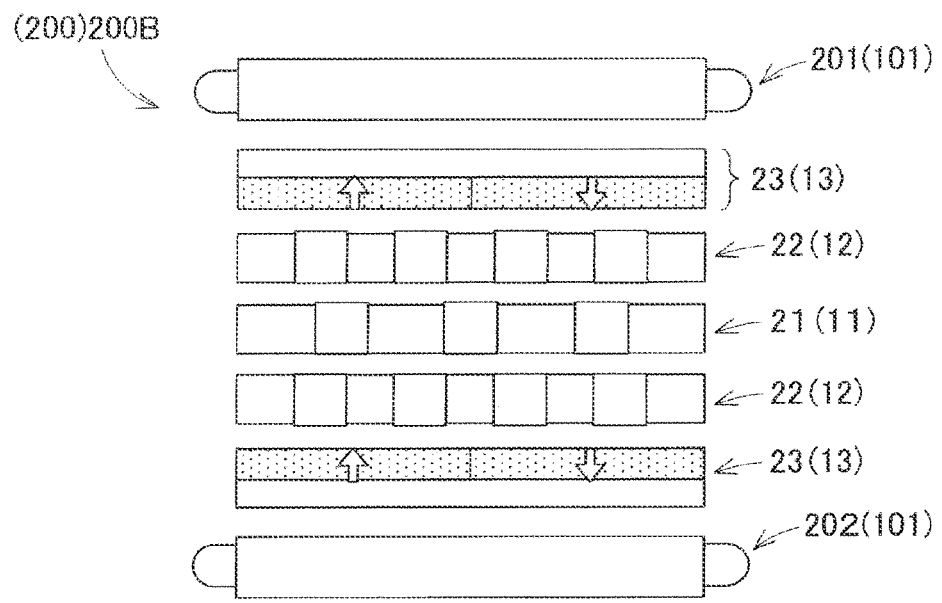
FIG. 33 is a plane view which illustrates a first modification of an automotive power generator according to the third embodiment.

While the present invention has been disclosed in terms of the first to third embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the intention as set forth in the appended claims. The invention may be embodied as described below.

a) in the eighth example of the second embodiment, the electric rotating machine 200A is, as illustrated in FIG. 28, equipped with only the armature 201, but however, may alternatively be designed, like in FIG. 33, to have two armatures. The electric rotating machine 200B in FIG. 33 is an example of the axial type of electric rotating machine 200 and includes a single first rotor 21, two second rotors 22, two third rotors 23, and two armatures 201 and 202. The first rotor 21 is disposed at the middle of the electric rotating machine 200B. The second rotors 22, the third rotors 23, and the armatures 201 and 202 are disposed symmetrically with respect to the first rotor 21 in the axial direction (i.e., the vertical direction in FIG. 33) of the electrical rotating machine 200B. The second rotors 22 may be mechanically joined together or not. Similarly, the third rotors 23 may be mechanically joined together or not. When the second rotors 22 are mechanically separate from each other, it enables the power to be transmitted between the second rotors 22. The same is true for the third rotors 23. Other arrangements are identical with those in the eighth example of the second embodiment. The structure of this modification is substantially identical in operation and beneficial effects with the eighth example of the second embodiment.

Figure 34:
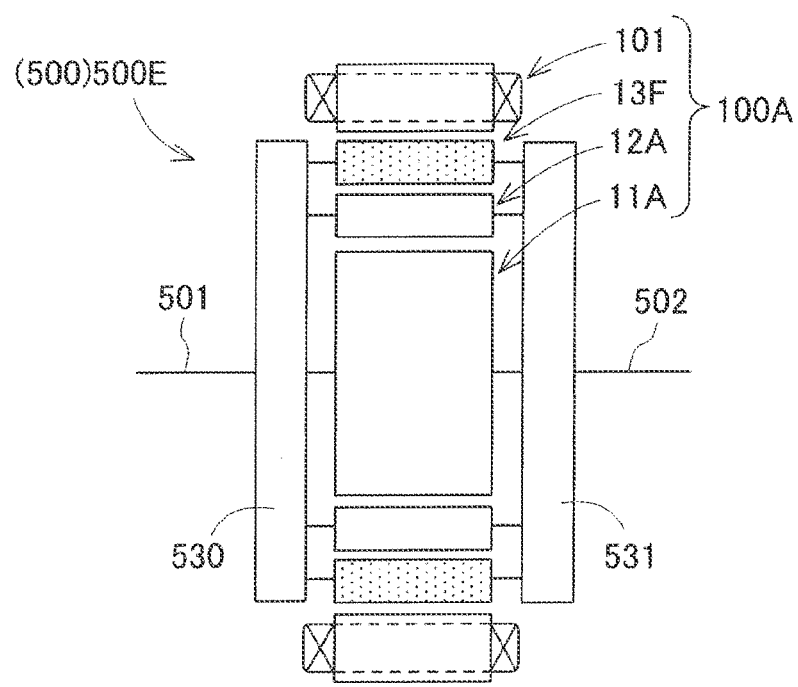
FIG. 34 is a plane view which illustrates a second modification of an automotive power generator according to the third embodiment.

In the absence of the armatures 201 and 202, the electrical rotating machine 200B may be employed as the power transmission mechanism 20 identical in operation with the power transmission mechanism 20A of FIG. 18. The second rotors 22 may be disposed at the middle of the electrical rotating machine 200B. In this case, the electrical rotating machine 200B may be employed as the power transmission mechanism 20 identical in operation with the power transmission: mechanism 20B of FIG. 19. The electrical rotating machine 100A, 300A, or 300B in the third embodiment, as shown in FIGS. 29 to 32, may be replaced with or in addition to the electric rotating machine 200B.

b) The first example of the third embodiment (i.e., the power generator 500A), as described above in FIG. 29, has the power transmitting member 501 joined to the second rotor 12A and the power transmitting member 502 joined to the first rotor 11A, but however, may be engineered, as illustrated in FIG. 34, to have a switch or selector 530 disposed between the rotors 11A and 12A and power transmitting member 501 and a selector 531 disposed between the rotors 11A and 12A and power transmitting member 502. The power generator 500A may alternatively be equipped with only one of the selectors 530 and 531. The selector 530 works as a first selecting mechanism to switch a mechanical connection of the power transmitting member 501 among the first rotor 11A, the second rotor 12A, and the third rotor 13F. Similarly, the selector 531 works as a second selecting mechanism to switch a mechanical connection of the power transmitting member 502 among the first rotor 11A, the second rotor 12A, and the third rotor 13F.

Specifically, the selector 530 is responsive to the control signal Sig, as outputted from the rotation controller 520 of FIG. 32, to establish the mechanical connection of the power transmitting member 501 to one of the first rotor 11A, the second rotor 12A, and the third rotor 13F. Similarly, the selector 531 is responsive to the control signal Sig, as outputted horn the rotation controller 520, to establish the mechanical connection of the power transmitting member 502 to one of the first rotor 11A, the second rotor 12A, and the third rotor 13F. The rotation controller 520 works to control the operations of the selectors 530 and 531 so as not to simultaneously connect the same one of the first rotor 11A, the second rotor 12A, and the third rotor 13F to both the power transmitting members 501 and 502. For instance, when it is required for the selector 530 to make the connection, between the first rotor 11A and the power transmitting member 501, the rotation controller 520 establishes the mechanical connection of the second rotor 12A or the third rotor 13F to the power transmitting member 502 through the selector 531 or disconnects the power transmitting member 502 from the rotors 11A, 12A, and 13F.

Figure 35:
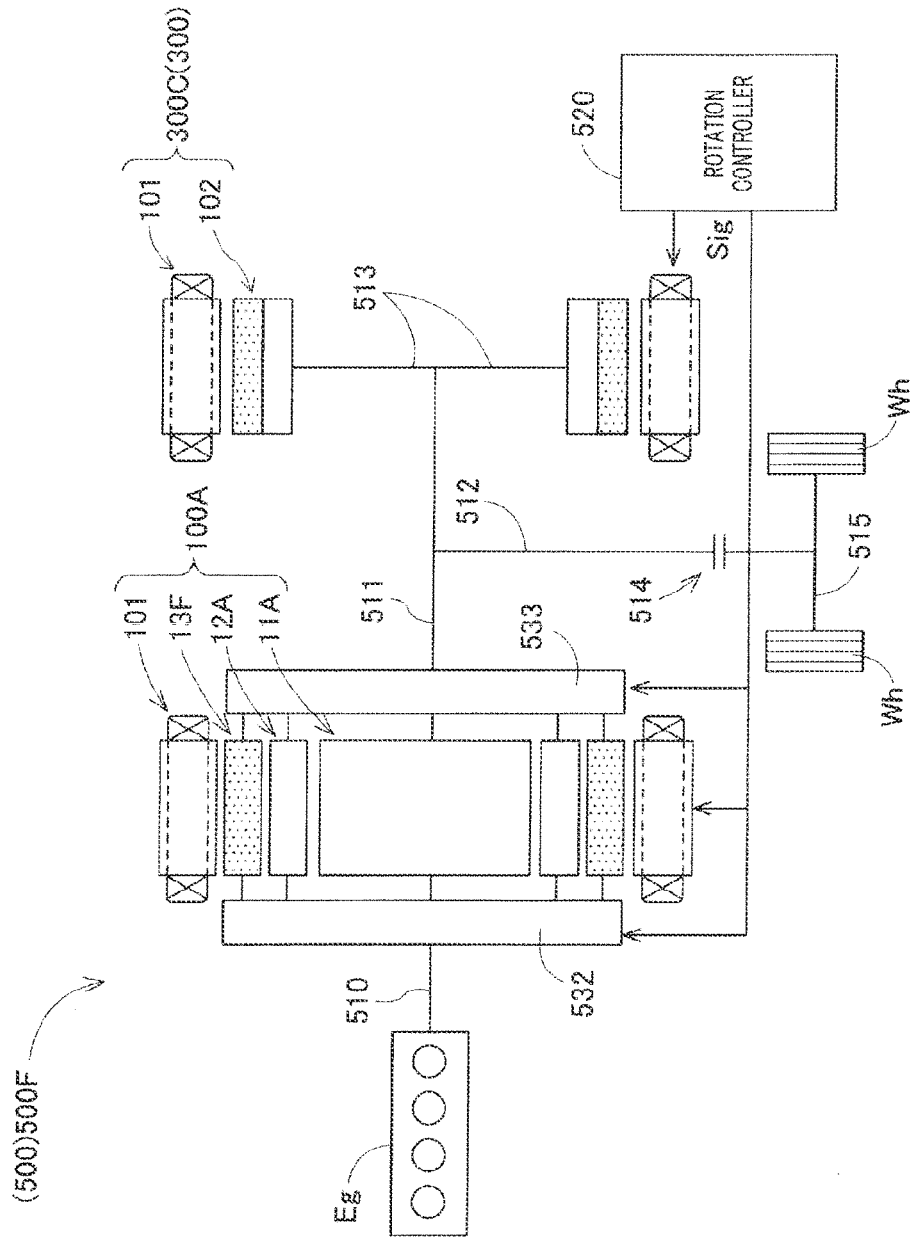
FIG. 35 is a plane view which illustrates a third modification of an automotive power generator according to the third embodiment.
Figure 36:
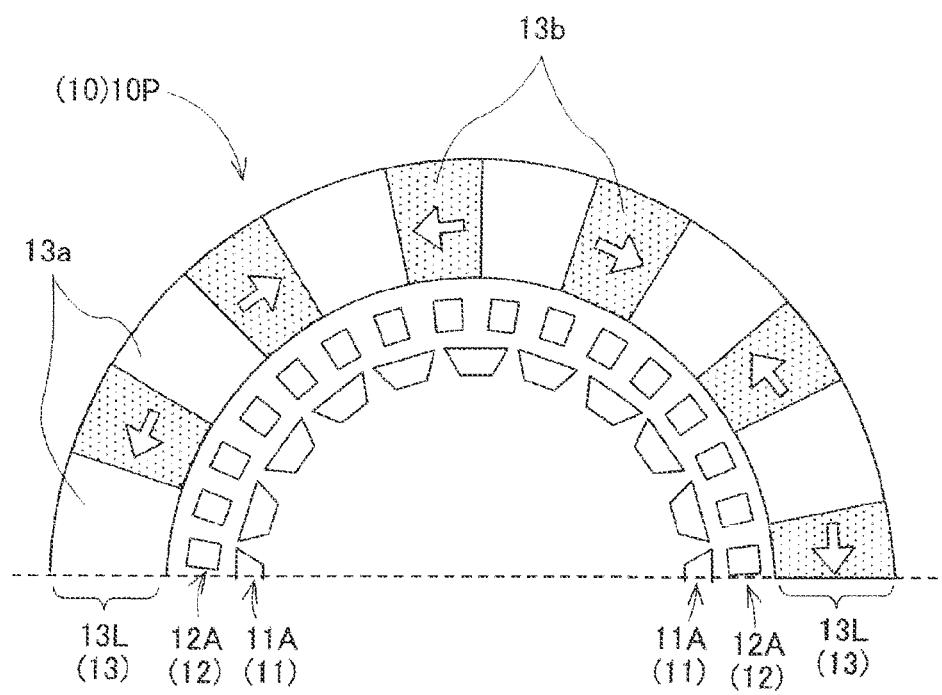
FIG. 36 is a partial transverse sectional view which illustrates a modification of a third rotor of the power transmission mechanism of the tenth example according to the first embodiment, as illustrated in FIG. 15.

The selectors 530 and 531 may be employed in any of the second to fourth, examples of the third embodiment. One such example is illustrated in FIG. 35. FIG. 32 shows the power generator 500F that is a modification of the power generator 500D of FIG. 32. Specifically, the power generator 500F has the selector 532 disposed between the power transmitting member 510 and the rotors 11A, 12A, and 13F and the selector 533 disposed between the power transmitting member 511 and the rotors 11A, 12A, and 13F. The power generator 500F may alternatively be equipped with only either of the selectors 532 and 533. The selector 532 works as the first selecting mechanism. The selector 533 works as a second selecting mechanism. The power generator 500F works to transmit the power only from the power transmitting member 510 to any of the rotors 11A, 12A, and 13F or vice versa or bi-directionally between the power transmitting member 510 and any of the rotors 11A, 12A, and 13F. The power generator 500F also works to transmit the power only from the power transmitting member 511 to any of the rotors 11A, 12A, and 13F or vice versa or bi-directionally between the power transmitting member 511 and any of the rotors 11A, 12A, and 13F.

c) The magnets 13b of the third rotor 13D in the tenth example of the first embodiment in FIG. 15 are all magnetized radially toward the center of the power transmission mechanism 10J, but may alternatively be magnetized radially outwardly. The number of pole pairs of the magnets 13b is m. FIG. 36 shows the power transmission mechanism 10P that is a modification of the power transmission mechanism 10J. The power transmission mechanism 10J includes the third rotor 13L equipped with the magnets 13b whose number of pole pairs is m and which are magnetized in a circumferential direction of the third rotor 13L. The orientations of every adjacent two of the magnets 13b are in opposite directions. Other arrangements are identical with those in the tenth example of the first embodiment. The structure of this modification, may be altered in the same way as in the second to ninth examples of the first embodiment. Such modifications offer substantially the same beneficial effects.

Beneficial Effects

The above described first to third embodiments provide the following advantages.

1) Each of the electric rotating machines 100, 200, and 300 is equipped with the first rotor 11 or 21, the second rotor 12a or 22, and the third rotor 13 or 23. The first rotor 11 or 21 has n soft-magnetic blocks 11a (11b, 11c, or 11d). The second rotor 12 or 22 has k soft-magnetic blocks 12a (12b 12c, 12d, 1.2e, 12f, and 12g). The third rotor 13 or 23 has the soft-magnetic blocks 13b (13c or 13e) whose number of pole pairs is m. Each of the electric rotating machines 100, 200, and 300 has the structure of the power transmission mechanism 10 or 20 to establish transmission of power magnetically. Each of the electric rotating machines 100, 200, and 300 also includes the armature 101, 201, 202, or a combination of the armatures 201 and 202 which faces the third rotor(s) 13 or 23. The first rotor 11 or 21, the second rotor 12 or 22, and the third rotor 13 or 23 are arranged so as to create a magnetic coupling between every adjacent two of them. The numbers of respective sets of the soft-magnetic blocks 11a to 11d, the numbers of respective sets of the soft-magnetic blocks 12a to 12g, and the numbers of respective sets of the magnets 13b, 13c, and 13e are, as described above, selected to meet a relation of 2m=|k±n| (see FIGS. 21 to 28). This arrangement functions as a magnetic gear to achieve the transmission of power or torque through the first rotor 11 or 21, the second rotor 12 or 22, and/or the third rotor 13 or 23 regardless of electric energization of the armature 101, 201, or 202, 2) The soft-magnetic blocks 11a to 11d and the soft-magnetic blocks 12a to 12g are arranged at intervals away from each other (see FIGS. 21 to 28), thereby enhancing the magnetic modulation and improving the ability to transmit power.

3) One of the first rotor 11 or 21 and the second rotor 12 or 22 is disposed between the other two of the first rotor 11 or 21, the second rotor 12 or 22 and the third rotor 13 or 23, in other words, it is disposed on an outermost or an innermost side of three coaxial rows of the first rotor 11 or 21, the second rotor 12 or 22, and the third rotor 13 or 23. U-shaped flows of magnetic flux are, as illustrated in FIGS. 21 and 22, created between the first rotor 11 or 21 and the second rotor 12 or 22, thereby enhancing the magnetic modulation and improving the ability of transmission of power.

4) The armature 101, 201, or 202, the first rotor 11 or 21, the second rotor 12 or 22, and the third rotor 13 or 23 are arranged in the form of four coaxial rows. The armature 101, 201, or 202 is located on an outermost or innermost one of the four coaxial rows. In the examples of FIGS. 21 to 28, the armature 101, 201, or 202 is disposed adjacent the third rotor 13. This layout ensures the stability in transmitting the power or torque between the third rotor 13 or 23 and the armature 101, 201, or 202, thus enhancing the ability of transmission of power in the electrical rotating machine 100 or 200.

5) in the structure in which a selected one of the first rotor 11 or 21, the second rotor 12 or 22, and the third rotors 13 or 23 is disposed between other two of them, as illustrated in, for example, FIGS. 21 to 28, the selected one has the number of pole pairs which is greater than those of the other two. In other words, one of the first rotor 11 or 21, the second rotor 12 or 22, and the third rotors 13 or 23 which is the greatest in number of pole pairs is disposed at the middle of three arrangements of the first rotor 11 or 21, the second rotor 12 or 22, and the third rotors 13 or 23, thus achieving good magnetic modulation and enhancing the ability of torque transmission.

6) In the structure of FIG. 23, the number of pole pairs of the armature 101 is identical with those of the third rotor 13. Each of the magnets 13b and corresponding two of the magnets 13e may, therefore, be unified into a single magnet.

7) The power generator 500 is equipped with one of the electric rotating machines 100, 200, and 300, the first power transmitting member that is one of the power transmitting members 501, 503, 507, 508, and 510, and the second power transmitting member that is one of the power transmitting members 502, 506, 509, and 511, and the rotation controller 520 (see FIGS. 29 to 32). The first power transmitting member establishes a mechanical connection between the engine Eg and a first selected one of the first rotor 11 or 21, second rotor 12 or 22, and the third rotor 13 or 23 to achieve transmission of power only in one direction or in both directions therebetween. The second power transmitting member connects with a second selected one of the first rotor 11 or 21, the second rotor 12 or 22, and the third rotor 13 or 23 to achieve transmission of power only in one direction or in both directions therebetween. The second selected one is different from the first selected one. The rotation controller 520, as described above, connects with one or two of the armatures 101, 201, and 202 and works as a speed controller to control the rotation or speed of one or more (i.e., at least one) of the first rotor 11 or 21, the second rotor 12 or 22, and the third rotor 13 or 23. This arrangement functions as a magnetic gear to achieve the transmission of power or torque through the first rotor 11 or 21, the second rotor 12 or 22, and/or the third rotor 13 or 23 regardless of electric energization of the armature 101, 201, or 202.

8) The power generator 500 is equipped with the axle 515 which connects through the power transmitting members 511 and 512 with a selected rotor that is one of the first rotor 11 or 21 and the second rotor 12 or 22 which is not joined to the engine Eg (see FIG. 32), so that the power or torque may be transmitted only in one direction or in both directions between the selected rotor and the axle 515. This arrangements is capable of transmitting the power from the selected rotor to the axle 515 or vice versa regardless of electric energization of the armature 101, 201, or 202.

9) The power generator 500 has the third power transmitting members (.i.e., the power transmitting member 512) disposed between the above described selected rotor and the axle 515 (see FIG. 32). This arrangement is capable of transmitting the power indirectly between the selected rotor and the axle 515 regardless of electric energization of the armature 101, 201, or 202. The use of the third power transmitting members improves the degree of freedom in layout of the engine Eg or the electric rotating machine 100, 200, or 300 in vehicles such as automobiles.

10) The power generator 500 is equipped with the first selecting mechanism that is one of the selectors 530 and 532 and the second selecting mechanism that is one of the selectors 531 and 533 (see FIGS. 34 and 35). The first selecting mechanism switches a mechanical connection of the engine Eg between at least two of the first rotor 11 or 21, the second rotor 12 or 22, and the third rotor 13 or 23 to establish the transmission of power only in one direction or in both directions therebetween. Similarly, the second selecting mechanism works to switch a mechanical connection of the axle 515 or the electric rotating machine between at least two of the first rotor 11 or 21, the second rotor 12 or 22, and the third rotor 13 or 23 which are not selected in mechanical connection to the engine Eg by the first selecting mechanism to establish the transmission of power only in one direction or in both directions therebetween. Specifically, the power generator 500 is capable of mechanically connecting the electric rotating machine 100, 200, or 300 to the engine Eg and/or the axle 515 to transmit the power among them regardless of electric energization of the armature 101, 201, or 202.

What is claimed is:

1. An electric rotating machine comprising:
   a power transmission mechanism which is equipped with a first rotor, a second rotor, and a third rotor and works to transmit power using magnetic force, the first rotor including n soft-magnetic members where n is an integer more than one, the second rotor including k soft-magnetic members where k is an integer more than one, the third rotor including magnets whose number of pole pairs is m where m is an integer more than or equal to one; and
   an armature which is disposed so as to face the third rotor, wherein the first rotor, the second rotor, and the third rotor are arranged so as to establish a magnetic coupling among them, and
   wherein the soft-magnetic members of the first and second rotors and the magnets of the third rotor meet a relation of $2m=|k\pm n|$.

2. An electric rotating machine as set forth in claim 1, wherein the soft-magnetic members of each of the first rotor and the second rotor are disposed at an interval away from each other.

3. An electric rotating machine as set forth in claim 1, wherein an endmost rotor that is one of the first rotor and the second rotor which is disposed on one side of an arrangement of the first, second, and third rotors, wherein a middle rotor that is one of the first rotor and the second rotor is disposed between other two of the first, second, and third rotors, and wherein U-shaped flows of magnetic flux are created between the endmost rotor and the middle rotor.

4. An electric rotating machine as set forth in claim 3, wherein the armature is located on an endmost side of the arrangement of the first, second, and third rotors which is opposite the endmost rotor.

5. An electric rotating machine as set forth in claim 1, wherein a middle rotor that is one of the first rotor and the second rotor which is disposed between other two of the first, second, and third rotors, the middle rotor being greater in number of pole pairs than the other two.

6. An electric rotating machine as set forth in claim 1, wherein the number of pole pairs of the armature is identical with that of the third rotor.

7. A power generator for a vehicle comprising:
an electric rotating machine which includes a power transmission mechanism and an armature, the power transmission mechanism being equipped with a first rotor, a second rotor, and a third rotor and working to transmit power using magnetic force, the first rotor including n soft-magnetic members where n is an integer more than one, the second rotor including k soft-magnetic members where k is an integer more than one, the third rotor including magnets whose number of pole pairs is m where m is an integer more than or equal to one, the first rotor, the second rotor, and the third rotor being arranged so as to establish a magnetic coupling among them, the soft-magnetic members of the first and second rotors and the magnets of the third rotor meeting a relation of $2m=|k\pm n|$;
a first power transmitting member which establishes a mechanical connection between a first selected one of the first rotor, the second rotor, and the third rotor and an engine to achieve transmission of power only in one direction or in both directions therebetween;
a second power transmitting mechanism which connects with a second selected one of the first rotor, the second rotor, and the third rotor to achieve transmission of power only in one direction or in both directions therebetween, the second selected one being different from the first selected one; and
a rotation controller which connects with the armature and works to control rotation of at least one of the first rotor, the second rotor, and the third rotor.

8. A power generator as set forth in claim 7, further comprising an axle which connects with a selected rotor that is one of the first rotor and the second rotor which is not joined to the engine to establish transmission of power only in one direction or in both directions between the selected rotor and the axle.

9. A power generator as set forth in claim 8, further comprising a third power transmitting member disposed between, the selected rotor and the axle.

10. A power generator as set forth in claim 7, further comprising a first selecting mechanism and a second selecting mechanism, the first selecting mechanism working to switch a mechanical connection of the engine between at least two of the first rotor, the second rotor, and the third rotor to establish transmission of power only in one direction or in both directions therebetween, the second selecting mechanism working to switch a mechanical connection of the axle or the electric rotating machine between at least two of the first rotor, the second rotor, and the third rotor which are not selected in mechanical connection to the engine by the first selecting mechanism to establish transmission of power only in one direction or in both directions therebetween.

* * * * *